(12) United States Patent
Liu

(10) Patent No.: US 12,086,022 B2
(45) Date of Patent: Sep. 10, 2024

(54) BUS MONITORING DEVICE AND METHOD, STORAGE MEDIUM, AND ELECTRONIC DEVICE

(71) Applicant: SANECHIPS TECHNOLOGY CO., LTD., Shenzhen (CN)

(72) Inventor: Nian Liu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 306 days.

(21) Appl. No.: 17/609,653

(22) PCT Filed: Jun. 15, 2020

(86) PCT No.: PCT/CN2020/096133
§ 371 (c)(1),
(2) Date: Nov. 8, 2021

(87) PCT Pub. No.: WO2020/259339
PCT Pub. Date: Dec. 30, 2020

(65) Prior Publication Data
US 2022/0206887 A1    Jun. 30, 2022

(30) Foreign Application Priority Data

Jun. 28, 2019   (CN) .......................... 201910578843.2

(51) Int. Cl.
*G06F 11/07* (2006.01)
(52) U.S. Cl.
CPC ........ *G06F 11/079* (2013.01); *G06F 11/0745* (2013.01)
(58) Field of Classification Search
CPC .......................... G06F 11/079; G06F 11/0745
See application file for complete search history.

(56) References Cited

U.S. PATENT DOCUMENTS

| 5,453,992 A | 9/1995 | Whetsel |
| 5,570,425 A * | 10/1996 | Goodman ........ G10K 11/17879 |
| | | 381/72 |

(Continued)

FOREIGN PATENT DOCUMENTS

| CN | 103903651 A | 7/2014 |
| CN | 106844118 A | 6/2017 |

(Continued)

OTHER PUBLICATIONS

European Patent Office. Extended European Search Report for EP Application No. 20832404.6, mailed May 19, 2022, pp. 1-7.

(Continued)

*Primary Examiner* — Jigar P Patel
(74) *Attorney, Agent, or Firm* — Vivacqua Crane, PLLC

(57) ABSTRACT

A bus monitoring device and method, a non-transitory computer-readable storage medium, and an electronic device are disclosed. The bus monitoring method may include: arranging monitoring nodes in a bus, with each monitoring node arranged in one of subsystems to be tested of the bus, where the monitoring nodes are connected in series in a ring topology (202); acquiring a test vector and sending a test message according to the test vector to one of the monitoring nodes to transmit the test message across the monitoring nodes, the test vector being configured to instruct each monitoring node to execute the test message and acquire test information of the respective subsystem to be tested, where the test information is configured to indicate information of the bus of the respective subsystem to be tested when the monitoring node executes the test message (204).

25 Claims, 8 Drawing Sheets

(56) References Cited

U.S. PATENT DOCUMENTS

| | | | |
|---|---|---|---|
| 2002/0034194 A1* | 3/2002 | Young | H04L 12/6418 |
| | | | 370/366 |
| 2003/0061020 A1 | 3/2003 | Michael | |
| 2012/0144256 A1* | 6/2012 | Bailey | G06F 11/26 |
| | | | 714/E11.155 |
| 2013/0218508 A1* | 8/2013 | Jindal | G01R 31/318577 |
| | | | 702/120 |
| 2019/0140648 A1* | 5/2019 | Clark | G11C 7/1078 |

FOREIGN PATENT DOCUMENTS

| | | |
|---|---|---|
| CN | 108802601 A | 11/2018 |
| CN | 109617767 A | 4/2019 |
| WO | 2003016931 A1 | 2/2003 |

OTHER PUBLICATIONS

Intellectual Property India. Examination Report for IN Application No. 202127053962, mailed May 23, 2022, pp. 1-7.

International Searching Authority. International Search Report and Written Opinion for PCT Application No. PCT/CN2020/096133 and English translation, mailed Sep. 24, 2020, pp. 1-10.

European Patent Office. Office Action for EP Application No. 20832404.6, mailed Oct. 11, 2023, pp. 1-3.

Japan Patent Office. First Notice of Reasons for Refusal for JP Application No. 2021-569023 and English translation, mailed Dec. 13, 2022, pp. 1-8.

Japan Patent Office. Second Notice of Reasons for Refusal for JP Application No. 2021-569023 and English translation, mailed Jun. 6, 2023, pp. 1-6.

* cited by examiner

BUS MONITORING DEVICE AND METHOD, STORAGE MEDIUM, AND ELECTRONIC DEVICE

CROSS-REFERENCE TO RELATED APPLICATION

This application is a national stage filing under 35 U.S.C. § 371 of international application number PCT/CN2020/096133, filed Jun. 15, 2020, which claims priority to Chinese patent application No. 201910578843.2 filed on Jun. 28, 2019. The contents of these applications are incorporated herein by reference in their entirety.

TECHNICAL FIELD

The present disclosure relates to the field of electronics, and in particular to a bus monitoring device and method, a non-transitory computer-readable storage medium and an electronic device.

BACKGROUND

With the updates of application requirements for telecommunication products and the ever-increasing integration of systems-on-chips (SoCs), buses inside the SoCs are getting more and more complex. The debugging and error locating for the buses in SoCs have always been a major problem that hinders the front-end design of chips, electronics design automation (EDA), field-programmable gate array (FPGA), hardware accelerator verification, software development and debugging for chips, etc.

In existing technologies, the main principle of bus monitoring technologies developed by the industry is to record all behaviors of bus nodes, which are formed into a data stream after being packaged and compressed, and then send the data stream to an on-chip buffer for storage or to an off-chip storage module for storage through a port of the SoC. This feature is typically called a trace method in the industry, which is similar to signal sampling and storage of an oscilloscope in that the data are recovered afterwards for debug technicians to analyze. Major chip companies in the industry usually use self-developed bus debugging systems, including toolchains, etc. For example, Advanced RISC Machines (ARM) Ltd. has defined a library of debug components called Coresight for buses. The above-mentioned bus debug technology (debug components) of ARM Ltd. is still similar to the monitoring mode in existing technologies, which cannot support the real-time error locating in principle and, instead, is considered as a passive debug mode that troubleshoots problems afterwards. Specifically, after a problem has appeared in the operation of a SoC, a tester can check and analyze the bus history afterwards so as to locate the problem, and both the workload and the requirements for analysis and locating are relatively high.

In addition, because the above bus debug technology of ARM Ltd. has to be supported by the toolchain from ARM Ltd., debuggers need to pay for the products from ARM Ltd., which do not allow location of newly customized content-to-be-traced and independent testing of each hardware unit in a bus. With such poor flexibility, a problematic node of the bus cannot be located quickly, thereby decreasing work efficiency.

For the technical problem in existing technologies that SoCs cannot monitor nodes in real time during operation, there is a need for a technical solution in existing technologies.

SUMMARY

The embodiments of the present disclosure provide a bus monitoring device and method, a non-transitory computer-readable storage medium and an electronic device, which are intended to solve the technical problem in existing technologies that SoCs cannot monitor nodes in real time during operation.

According to an embodiment of the present disclosure, there is provided a bus monitoring device, which may include: a plurality of monitoring modules configured to be arranged in a bus, each monitoring module being configured to be arranged in a respective one of a plurality of subsystems to be tested of the bus, where the plurality of monitoring modules are connected in series in a ring topology; and a control module configured to acquire a test vector and send a test message according to the test vector to one of the plurality of monitoring modules so as to transmit the test message across the plurality of monitoring modules, each monitoring module being configured to execute the test message and acquire test information of the respective subsystem to be tested, where the test information of the respective subsystem to be tested is configured to indicate information of the bus of the respective subsystem to be tested when the monitoring module executes the test message.

According to another embodiment of the present disclosure, there is also provided a bus monitoring method applicable to a control module, which may include: arranging a plurality of monitoring nodes in a bus, with each monitoring node arranged in a respective one of a plurality of subsystems to be tested of the bus, where the plurality of monitoring nodes are connected in series in a ring topology; and acquiring a test vector and sending a test message according to the test vector to one of the plurality of monitoring nodes so as to transmit the test message across the plurality of monitoring nodes, the test vector being configured to instruct each monitoring node to execute the test message and acquire test information of the respective subsystem to be tested, where the test information of the respective subsystem to be tested is configured to indicate information of the bus of the respective subsystem to be tested when the monitoring node executes the test message.

According to another embodiment of the present disclosure, there is also provided a bus monitoring method applicable to a monitoring node, which may include: arranging a plurality of monitoring nodes in a bus, with each monitoring node arranged in a respective one of a plurality of subsystems to be tested of the bus, where the plurality of monitoring nodes are connected in series in a ring topology; and receiving and executing a test message and acquiring test information of the respective subsystem to be tested, the test information of the respective subsystem to be tested being configured to indicate information of the bus of the respective subsystem to be tested when the monitoring node executes the test message, where the test message is sent from a control module to one of the plurality of monitoring nodes according to a test vector acquired so as to transmit the test message across the plurality of monitoring nodes.

According to another embodiment of the present disclosure, there is also provided a bus monitoring device applicable to a control module, which may include: a topology unit configured to arrange a plurality of monitoring nodes in a bus, with each monitoring node arranged in a respective one of a plurality of subsystems to be tested of the bus, where the plurality of monitoring nodes are connected in series in a ring topology; and a control unit configured to acquire a test vector and send a test message according to the test vector to one of the plurality of monitoring nodes so as to transmit the test message across the plurality of monitoring nodes, the test vector being configured to instruct each monitoring node to execute the test message and acquire test information of the respective subsystem to be tested, where the test information of the respective subsystem to be tested is configured to indicate information of the bus of the respective subsystem to be tested when the monitoring node executes the test message.

According to another embodiment of the present disclosure, there is also provided a bus monitoring device applicable to a monitoring node, which may include: a topology unit configured to arrange a plurality of monitoring nodes in a bus, with each monitoring node arranged in a respective one of a plurality of subsystems to be tested of the bus, where the plurality of monitoring nodes are connected in series in a ring topology; and a monitoring unit configured to receive and execute a test message and acquire test information of the subsystem to be tested, the test information of the subsystem to be tested being configured to indicate information of the bus of the subsystem to be tested when the monitoring node executes the test message, where the test message is sent from a control module for transmission across the plurality of monitoring nodes.

According to yet another embodiment of the present disclosure, there is also provided a non-transitory computer-readable storage medium in which a computer program is stored, where the computer program is configured to, when executed, implement the steps of any of the above method embodiments.

According to yet another embodiment of the present disclosure, there is also provided an electronic device, which may include a memory and a processor, where a computer program is stored in the memory, and the processor is configured to execute the computer program to perform the steps in any of the above method embodiments.

BRIEF DESCRIPTION OF DRAWINGS

The accompanying drawings described here are used to provide an understanding of the present disclosure and constitute a part of the present disclosure. The illustrative embodiments of the present disclosure and their descriptions are used to explain the present disclosure, and do not constitute an improper limitation to the present disclosure. In the accompanying drawings.

DETAILED DESCRIPTION

The present disclosure will be described below with reference to the accompanying drawings in conjunction with embodiments.

It should be noted that the terms "first", "second", etc. in the description and the claims of the present disclosure and the above-mentioned drawings are intended to distinguish similar objects and are not necessarily to describe a specific order or sequence.

Generally speaking, SoC bus protocols are typically based on multi-channel processing. For example, there are five channels in Advanced eXtensible Interface (AXI) developed by ARM Ltd., i.e. a read address channel (AR), a read data channel (R), a write address channel (AW), a write data channel (W), and a write response channel (B). In the embodiments of the present disclosure, the AXI bus of ARM Ltd. is used for explanation.

Example Embodiment One

Figure 1:
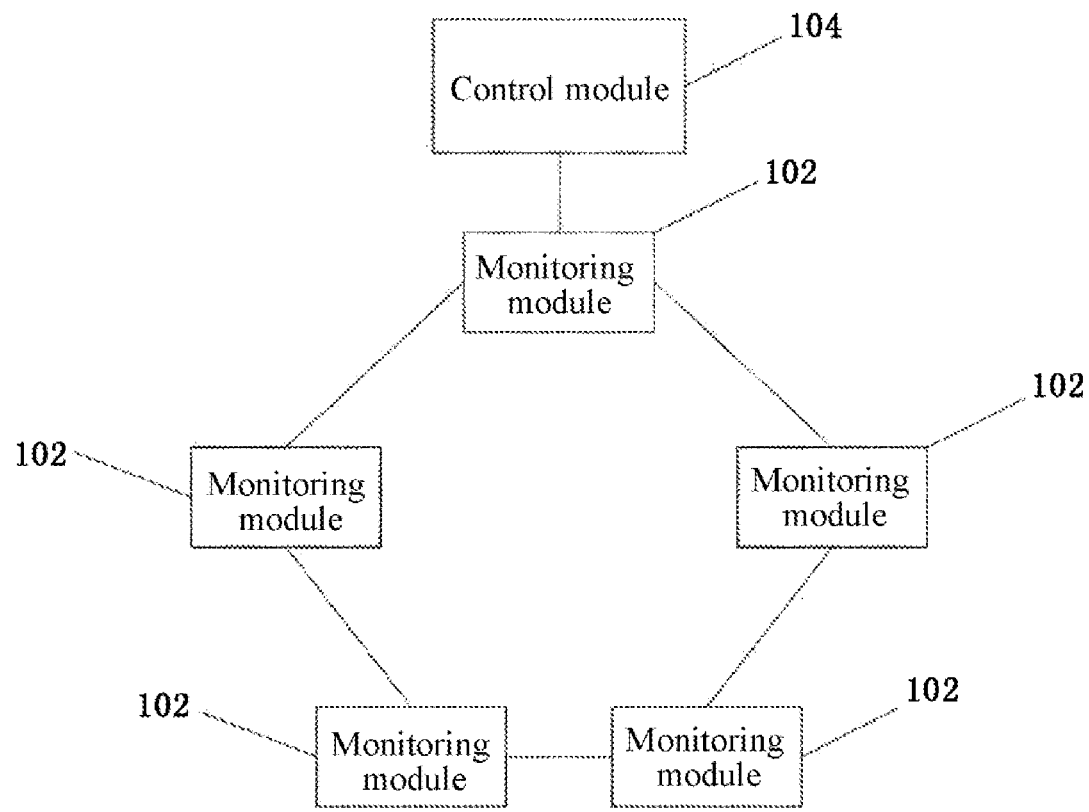
FIG. 1 is a schematic functional block diagram (I) of a bus monitoring device according to an embodiment of the present disclosure.

This embodiment provides a bus monitoring device. FIG. 1 is a functional block diagram (I) of a bus monitoring device according to an embodiment of the present disclosure. As shown in FIG. 1, the bus monitoring device includes: a plurality of monitoring modules 102 configured to be arranged in a bus, each monitoring module 102 being configured to be arranged in a respective one of a plurality of subsystems to be tested of the bus, where the plurality of monitoring modules 102 are connected in series in a ring topology; and a control module 104 configured to acquire a test vector and send a test message according to the test vector for transmission across the plurality of monitoring modules 102, each monitoring module 102 being configured to execute the test message and acquire test information of the respective subsystem to be tested, where the test information of the respective subsystem to be tested is configured to indicate information of the bus of the respective subsystem to be tested when the monitoring module executes the test message.

According to the bus monitoring device of this embodiment, since the bus monitoring device includes a plurality of monitoring modules arranged in the bus, each monitoring module is configured to be arranged in a respective one of a plurality of subsystems to be tested of the bus, where the plurality of monitoring modules are connected in series in a ring topology; and the bus monitoring device acquires a test vector through the control module and sends a test message according to the test vector for transmission across the plurality of monitoring modules; and each monitoring module may execute the test message and acquire test information of the respective subsystem to be tested, where the test information of the respective subsystem to be tested is configured to indicate information of the bus of the respective subsystem to be tested when the monitoring module executes the test message. Therefore, the bus monitoring device in this embodiment can solve the technical problem in existing technologies that SoCs cannot monitor nodes in real time during operation, so as to achieve the effect of real-time node monitoring during operation of SoCs.

In this embodiment, the bus monitoring device can realize real-time monitoring of the plurality of subsystems to be tested in the bus during their operation by means of the monitoring modules executing the test message to acquire information of the bus of the subsystems to be tested. Therefore, in one aspect, once a problem occurs during operation of the bus, a debugger can quickly locate the node (i.e., the subsystem to be tested) where the problem occurs, thus improving the efficiency of locating and solving bus problems; and in another aspect, since the bus device in this embodiment does not need to trace and monitor all actions of the subsystems to be tested according to the existing technologies, this embodiment can effectively reduce logic processing resources and storage resources reserved for the implementation of monitoring, thereby reducing the costs or pressure of the system.

In this embodiment, a plurality of monitoring modules are provided independently of each other, so that the independent testability of different subsystems to be tested in the system can be effectively improved, and the coupling between the plurality of subsystems to be tested can be reduced. When hardware units in the system are altered, the bus monitoring device in this embodiment can also add a monitoring module and connect the newly added monitoring module to the original topology, so as to realize the flexible configuration of the subsystems to be tested in the system and improve the flexibility of monitoring.

In this embodiment, the network formed by the ring topology of the plurality of monitoring modules can be called a token ring network, and the connection mode between the plurality of monitoring modules is that the plurality of monitoring modules are connected in series.

In an alternative embodiment, the control module 104 being configured to send a test message according to the test vector for transmission across the plurality of monitoring modules includes: the control module being configured to acquire the test vector, parse the test vector to obtain the test message, and send the test message for transmission across the plurality of monitoring modules.

The test message in this embodiment adopts a data message in a specified frame format, and the data message includes: header information, instruction identity (ID) information, operation command information, instruction address information, message length information, and instruction data information.

In an alternative embodiment, the control module 104 being configured to send a test message according to the test vector for transmission across the plurality of monitoring modules further includes: the control module being configured to acquire the test vector and parsing the test vector to obtain the test message; generating a configuration message according to the test message and sending the configuration message to the plurality of subsystems to be tested of the bus, where the configuration message is configured to instruct the plurality of subsystems to be tested to perform configuration processing according to the configuration message; and after the plurality of subsystems to be tested finish the configuration processing, sending the test message for transmission across the plurality of monitoring modules.

The configuration message is configured to cause the plurality of subsystems to be tested to be configured according to the requirements of the test vector, such as activating respective registers in the subsystems to be tested, or setting corresponding match values in the registers according to the requirements of the test vector.

In an alternative embodiment, the test message includes a plurality of test sub-messages, each of which carries first identification information configured to identify one of the subsystems to be tested; and each test sub-message is configured to instruct a monitoring module to execute the test sub-message according to the first identification information, where the monitoring module is the monitoring module arranged in the subsystem to be tested which is identified by the first identification information.

The plurality of test sub-messages contained in the test message are configured to instruct monitoring modules arranged in different subsystems, respectively, to execute respective test sub-messages. Typically, the first identification information in the test sub-message may be, but is not limited to, address information of the subsystem to be tested. Any identification information that can identify different subsystems to be tested may be used as the first identification information, for example, the ID of the equipment to be tested may be used, or multiple pieces of identification information may be used comprehensively, which is not limited in the present disclosure.

During transmission of the test message from the control module to the plurality of monitoring modules, either a write operation or a read operation is a 32-bit data message, and the first identification information is carried in this data message. For a write operation, the control module sends a test message packaged according to a preset frame format to the plurality of monitoring modules, the test message including an ID number, a write control signal, an address of the subsystem to be tested, a register address of the subsystem to be tested and data to be written, where the address of the subsystem to be tested may represent the first identification information to identify the address of the subsystem to be tested. Once received by any one of the monitoring modules, the test message can be transmitted in the token ring network formed by the plurality of monitoring modules. Each monitoring module, after receiving the test message, detects whether the address of the respective subsystem to be tested matches the address of the subsystem to be tested in the data. If the two do not match each other, the test message will be transmitted to the next monitoring module in series for the next monitoring module to process. If the two match each other, the original data will be transmitted, while remaining unchanged, to the next monitoring module in serial after the write operation corresponding to the address is executed. If none of the addresses of the subsystems to be tested can be matched, the original data will also be returned, while remaining unchanged, to the test control module.

Figure 2:
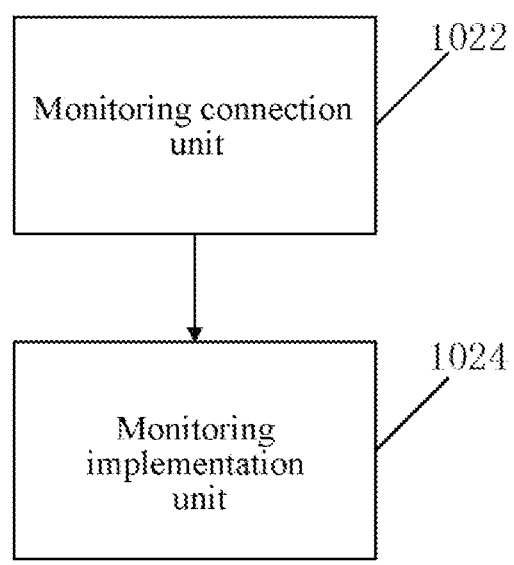
FIG. 2 is a schematic block diagram of a monitoring module according to an embodiment of the present disclosure.

Each monitoring module 102 of this embodiment may generally be composed of a monitoring connection unit 1022 and a monitoring implementation unit 1024, where the monitoring connection unit 1022 is configured to realize the connection between the monitoring module and the respective subsystem to be tested and to read, package and transmit the test information of the respective subsystem to be tested, and the monitoring implementation unit 1024 is configured to implement the monitoring of the respective subsystem to be tested. The receiving of the test message by the monitoring module can be realized by the monitoring connection unit, while the monitoring of the respective subsystem to be tested, i.e. monitoring whether the address of the respective subsystem to be tested matches the address of the subsystem to be tested in the data, may be realized by the monitoring implementation unit 1024. FIG. 2 is a block diagram of a monitoring module according to an embodiment of the present disclosure. The internal functional structure of the monitoring module 104 above is shown in FIG. 2.

In an alternative embodiment, each monitoring module includes a first monitoring implementation unit configured to acquire first test information of the respective subsystem to be tested and a second monitoring implementation unit configured to acquire second test information of the respective subsystem to be tested, where the first test information of the respective subsystem to be tested includes information of a write address channel, a write data channel, and a write response channel of the bus of the respective subsystem to be tested, and the second test information of the respective subsystem to be tested includes information of a read address channel and a read data channel of the bus of the respective subsystem to be tested.

The arrangement of the first monitoring implementation unit and the second monitoring implementation unit enables time-division multiplexing of information of the write address channel, write data channel and write response channel in the bus information of each subsystem to be tested over the first monitoring implementation unit and also time-division multiplexing of the information of the read address channel and read data channel in the bus information of each subsystem to be tested over the second monitoring implementation unit, thereby saving three implementation units for the channels and thus saving logic processing resources and storage resources while ensuring monitoring by the monitoring module of the bus information of the respective subsystem to be tested.

Each monitoring module of this embodiment may generally be composed of a monitoring connection unit and a monitoring implementation unit, where the monitoring connection unit is configured to realize the connection between the monitoring module and the respective subsystem to be tested and to read, package and transmit the test information of the respective subsystem to be tested, and the monitoring implementation unit is configured to implement the monitoring of the respective subsystem to be tested. The receiving of the test message by the monitoring module can be realized by the monitoring connection unit, while the monitoring of the respective subsystem to be tested, i.e. monitoring whether the address of the respective subsystem to be tested matches the address of the subsystem to be tested in the data, may be realized by the monitoring implementation unit.

In an alternative embodiment, the monitoring module being configured to execute the test message and acquire test information of the respective subsystem to be tested includes: the monitoring module being configured to acquire the test information of the respective subsystem to be tested in response to the address channels, the data channels and the response channel of the bus of the respective subsystem to be tested meeting a preset trigger sequence condition, where the address channels, the data channels and the response channel of the bus of the respective subsystem to be tested meeting a preset trigger sequence condition includes at least one of the following: when the address channels are matching objects of the monitoring module, the trigger sequence condition is that the data channels are triggered prior to the address channels; when the data channels are matching objects of the monitoring module, the trigger sequence condition is that the address channels are triggered prior to the data channels; or when the response channel is a matching object of the monitoring module, the trigger sequence condition is that both the address channels and the data channels are triggered prior to the response channel.

The monitoring module can acquire the information, i.e. the test information, that the respective subsystem to be tested successfully handshakes in respective channels in response to the respective channels of the subsystem to be tested meeting the preset trigger sequence. There may be one or more monitoring objects, i.e. matching objects, for the monitoring module.

In an alternative embodiment, the monitoring module being configured to execute the test message and acquire test information of the respective subsystem to be tested includes: the monitoring module being configured to acquire bus handshake information, within a preset range, of the write address channel, the write data channel, the write response channel, the read address channel, and the read data channel of the bus of the respective subsystem to be tested.

The preset range may indicate bus handshake information at different times, such as the last piece of bus handshake information.

In an alternative embodiment, the monitoring module being configured to execute the test message and acquire test information of the respective subsystem to be tested includes: the monitoring module being configured to acquire a difference between a number of successful handshakes of the write address channel and a number of successful handshakes of the write response channel, and a difference between a number of successful handshakes of the read address channel and a number of successful handshakes of the read data channel of the bus of the respective subsystem to be tested; and the monitoring module being further configured to report a silence timeout interrupt in response to the differences being non-zero and the differences remaining unchanged for a period of time greater than a preset threshold.

In an alternative embodiment, the monitoring module being configured to execute the test message and acquire test information of the respective subsystem to be tested includes: the monitoring module being configured to acquire address information, within a preset range, of the write address channel and the read address channel of the bus of the respective subsystem to be tested, where the address information within the preset range refers to address information of OUTSTANDING transactions on an out-of-order basis counted from a current time.

In an alternative embodiment, the monitoring module being configured to acquire test information of the respective subsystem to be tested includes: the monitoring module being configured to acquire the test information of the respective subsystem to be tested and send the test information to the control module.

In an alternative embodiment, the monitoring module being configured to acquire test information of the respective subsystem to be tested further includes: the monitoring module being configured to acquire the test information of the respective subsystem to be tested, package the test information according to a preset frame format, and send the packaged test information to the control module.

In an alternative embodiment, the packaged test information carries second identification information configured to identify the control module.

The above second identification information may be an ID number of the control module, as the control module can be identified based on the fact that each control module has a unique ID number.

When the monitoring module acquires the test information of the subsystem to be tested and packages the test information to send it to the control module, the ID number of the control module can be added in the packaging process. Once the test information is received, the control module will detect the ID number carried in the test information. If the ID number in the feedback data matches the ID number of the control module in the test information, the feedback data will be stored. If the two do not match each other, the feedback data will be passed on in serial while remaining unchanged.

Figure 3:
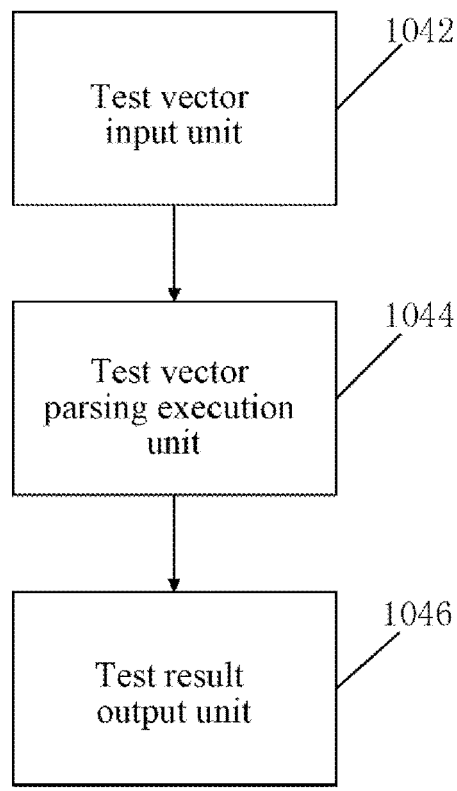
FIG. 3 is a schematic block diagram of a control module according to an embodiment of the present disclosure.

In this embodiment, the control module 104 may generally be composed of a test vector input unit 1042, a test vector parsing execution unit 1044 and a test result output unit 1046, where the test vector input unit is configured to receive a test vector and store the test vector in a dedicated RAM or any address space on the bus interconnect; the test vector parsing execution unit is configured to read the test vector from the above storage space, execute parsing of the test vector to obtain a test message, issue the test message, and write or read feedback test information into a specified address space; and the test result output unit is configured to send the test information stored in the specified address space to the outside, such as a test master. FIG. 3 is a block diagram of a control module according to an embodiment of the present disclosure. The internal functional structure of the above control module is shown in FIG. 3.

In addition, the control module needs to be able to: detect data written by the plurality of monitoring modules into the control module, and determine whether to read or write data by itself according to a read or write control signal and a feedback signal; determine correctness of the operation and extract the data correctly according to the address of the subsystem to be tested and the register address of the subsystem to be tested; and determine whether the operation is correctly done according to a returned feedback signal value.

Read operation: Normally, two read operations need to be performed to complete a read operation. For the first read operation, an equipment number, register address, read control signal, etc. of the respective subsystem to be tested are input to the monitoring module, and a feedback signal value of 2'b10 is returned, in which case the 16-bit data read back is invalid. The same 32-bit value is input for the second time and a feedback signal value is 2'b11, then the read operation is completed and a 16-bit value read back at this time is the required data value. If the feedback in the data read back for the first time is 2'b01, which indicates that the storage space is full, the device needs to perform the following operations: determining whether the data has been read without finishing the corresponding second operation. If the answer is yes, the read operation is completed. If the answer is no, which indicates another device is reading the register data of this subsystem to be tested, the device needs to wait and repeatedly send the read data until a feedback signal of 2'b10 is returned, which means that the read operation is in progress and the data can be read back next time.

Write operation: Different from the read operation, only one write operation needs to be performed to complete a write operation. The corresponding input according to the specified 32-bit data format is written through an asynchronous receiver-transmitter module of the device, then an equipment number, register address and write control signal of the respective subsystem to be tested are input to the monitoring module through the serial bus internally, and a feedback signal value of 2'b11 is returned. Neither of the feedback signal values of 2'b10 and 2'b01 will occur in a write operation.

For write and read operations, if a feedback signal value of 2'b00 is returned, it means that the input equipment number of the monitoring module does not match any of the equipment numbers of the subsystems to be tested in the bus, and the input equipment number of the monitoring module needs to be checked.

Figure 4:
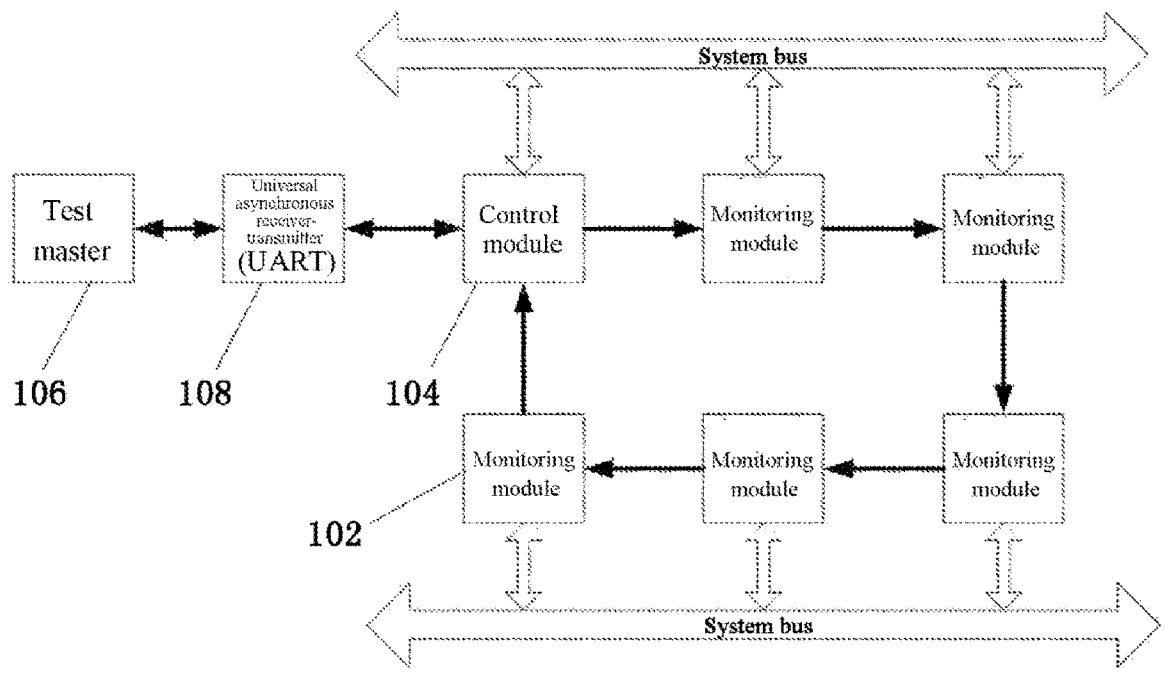
FIG. 4 is a schematic functional block diagram (II) of a bus monitoring device according to an embodiment of the present disclosure.

In an alternative embodiment, FIG. 4 is a functional block diagram (II) of a bus monitoring device according to an embodiment of the present disclosure. As shown in FIG. 4, the device further includes: a test master 106 configured to generate a preset test vector; and a universal asynchronous receiver-transmitter 108 configured to send the test vector to the control module and receive the test information from the control module.

Example Embodiment Two

Figure 5:
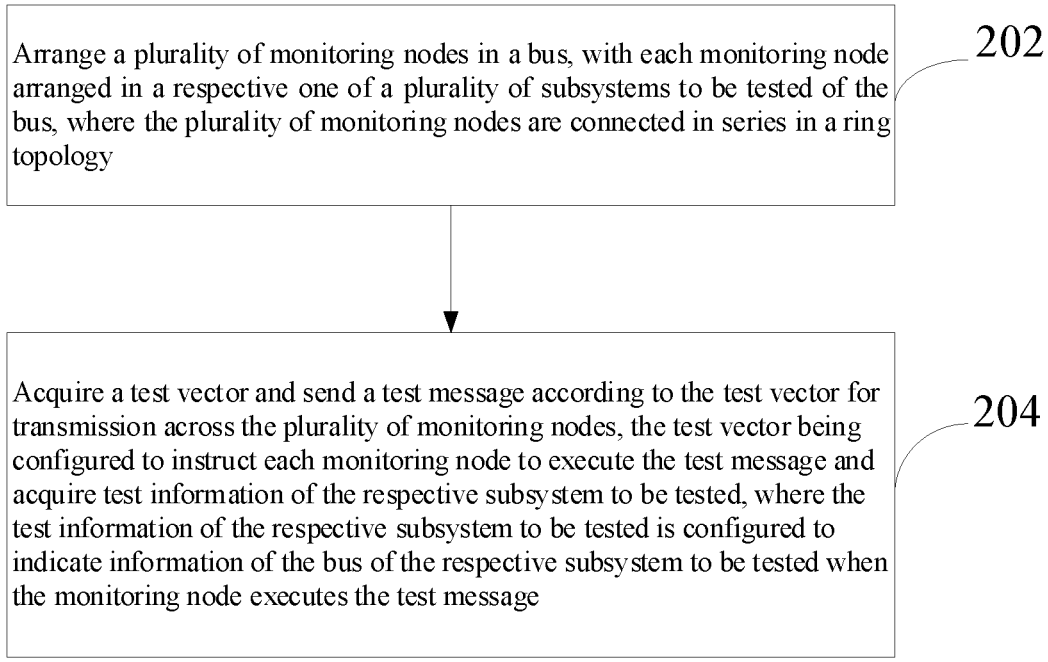
FIG. 5 is a flowchart (I) of a bus monitoring method according to an embodiment of the present disclosure.

This embodiment further provides a bus monitoring method applicable to a control module. FIG. 5 is a flowchart (I) of a bus monitoring method according to an embodiment of the present disclosure. As shown in FIG. 5, the bus monitoring method includes:

step 202: arranging a plurality of monitoring nodes in a bus, with each monitoring node arranged in a respective one of a plurality of subsystems to be tested of the bus, where the plurality of monitoring nodes are connected in series in a ring topology;

step 204: acquiring a test vector and sending a test message according to the test vector for transmission across the plurality of monitoring nodes, the test vector being configured to instruct each monitoring node to execute the test message and acquire test information of the respective subsystem to be tested, where the test information of the respective subsystem to be tested is configured to indicate information of the bus of the respective subsystem to be tested when the monitoring node executes the test message.

According to the bus monitoring method in this embodiment, since the plurality of monitoring nodes in the bus can be each arranged in a respective subsystem to be tested in the bus, where the plurality of monitoring nodes are connected in series in a ring topology, when the control module acquires a test vector and sends a test message according to the test vector for transmission across the plurality of monitoring nodes, each monitoring node may execute the test message and acquire test information of the respective subsystem to be tested, where the test information of the respective subsystem to be tested is configured to indicate information of the bus of the respective subsystem to be tested when the monitoring node executes the test message. Therefore, the bus monitoring method in this embodiment can solve the technical problem in existing technologies that SoCs cannot monitor nodes in real time during operation, so as to achieve the effect of real-time node monitoring during operation of SoCs.

In this embodiment, the bus monitoring method can realize real-time monitoring of the plurality of subsystems to be tested in the bus during their operation by means of the monitoring nodes executing the test message to acquire information of the bus of the subsystems to be tested. Therefore, in one aspect, once a problem occurs during operation of the bus, a debugger can quickly locate the node (i.e., the subsystem to be tested) where the problem occurs, thus improving the efficiency of locating and solving bus problems; and in another aspect, since the bus device in this embodiment does not need to trace and monitor all actions of the subsystems to be tested according to the existing technologies, this embodiment can effectively reduce logic processing resources and storage resources reserved for the implementation of monitoring, thereby reducing the costs or pressure of the system.

In this embodiment, a plurality of monitoring nodes are provided independently of each other, so that the independent testability of different subsystems to be tested in the system can be effectively improved, and the coupling between individual subsystems to be tested can be reduced. When hardware units in the system are altered, the bus monitoring device in this embodiment can also add a monitoring node and connect the newly added monitoring node to the original topology, so as to realize the flexible configuration of the subsystems to be tested in the system and improve the flexibility of monitoring.

In this embodiment, the network formed by the ring topology of the plurality of monitoring nodes can be called a token ring network, and the connection mode between the plurality of monitoring nodes is that the plurality of monitoring nodes are connected in series.

In an embodiment, in step 204 above, acquiring a test vector and sending a test message according to the test vector for transmission across the plurality of monitoring nodes includes: acquiring the test vector, parsing the test vector to obtain the test message, and sending the test message for transmission across the plurality of monitoring nodes.

The test message in this embodiment adopts a data message in a specified frame format, and the data message includes: header information, instruction ID information, operation command information, instruction address information, message length information, and instruction data information.

In an embodiment, in step 204 above, acquiring a test vector and sending a test message according to the test vector for transmission across the plurality of monitoring nodes further includes: acquiring the test vector and parsing the test vector to obtain the test message; generating a configuration message according to the test message and sending the configuration message to the plurality of subsystems to be tested of the bus, where the configuration message is configured to instruct the plurality of subsystems to be tested to perform configuration processing according to the configuration message; and after the plurality of subsystems to be tested finish the configuration processing, sending the test message for transmission across the plurality of monitoring nodes.

The configuration message is configured to cause the plurality of subsystems to be tested to be configured according to the requirements of the test vector, such as activating respective registers in the subsystems to be tested, or setting corresponding match values in the registers according to the requirements of the test vector.

In an alternative embodiment, the test message includes a plurality of test sub-messages, each of which carries first identification information configured to identify one of the subsystems to be tested; and each test sub-message is configured to instruct a monitoring node to execute the test sub-message according to the first identification information, where the monitoring node is the monitoring node arranged in the subsystem to be tested which is identified by the first identification information.

The plurality of test sub-messages contained in the test message are configured to instruct monitoring units arranged in different subsystems, respectively, to execute respective test sub-messages. Typically, the first identification information in the test sub-message may be, but is not limited to, address information of the subsystem to be tested. Any identification information that can identify different subsystems to be tested may be used as the first identification information, which is not limited in the present disclosure.

In an alternative embodiment, in step 204 above, the test vector being configured to instruct each monitoring node to execute the test message and acquire test information of the respective subsystem to be tested includes: performing time-division multiplexing with a first monitoring implementation unit to acquire information of a write address channel, a write data channel and a write response channel of the bus of the respective subsystem to be tested, and performing time-division multiplexing with a second monitoring implementation unit to acquire information of a read address channel and a read data channel of the bus of the respective subsystem to be tested, where the first monitoring implementation unit and the second monitoring implementation unit are both arranged in the monitoring node.

The arrangement of the first monitoring implementation unit and the second monitoring implementation unit enables time-division multiplexing of information of the write address channel, write data channel and write response channel in the bus information of each subsystem to be tested over the first monitoring implementation unit and also time-division multiplexing of the information of the read address channel and read data channel in the bus information of each subsystem to be tested over the second monitoring implementation unit, thereby saving three implementation units for the channels and thus saving logic processing resources and storage resources while ensuring monitoring by the monitoring node of the bus information of the respective subsystem to be tested.

In an alternative embodiment, in step 204 above, the test vector being configured to instruct each monitoring node to execute the test message and acquire test information of the respective subsystem to be tested includes: instructing each monitoring node to acquire the test information of the respective subsystem to be tested in response to the address channels, the data channels and the response channel of the bus of the respective subsystem to be tested meeting a preset trigger sequence condition, where the address channels, the data channels and the response channel of the bus of the respective subsystem to be tested meeting a preset trigger sequence condition includes at least one of the following: when the address channels are matching objects of the monitoring node, the trigger sequence condition is that the data channels are triggered prior to the address channels; when the data channels are matching objects of the monitoring node, the trigger sequence condition is that the address channels are triggered prior to the data channels; or when the response channel is a matching object of the monitoring node, the trigger sequence condition is that both the address channels and the data channels are triggered prior to the response channel.

The monitoring module can acquire the information, i.e. the test information, that the respective subsystem to be tested successfully handshakes in respective channels in response to the respective channels of the subsystem to be tested meeting the preset trigger sequence. There may be one or more monitoring objects, i.e. matching objects, for the monitoring module.

In an alternative embodiment, in step 204 above, the test vector being configured to instruct each monitoring node to execute the test message and acquire test information of the respective subsystem to be tested includes: instructing the monitoring node to acquire bus handshake information, within a preset range, of the write address channel, the write data channel, the write response channel, the read address channel, and the read data channel of the bus of the respective subsystem to be tested.

The preset range may indicate bus handshake information at different times, such as the last piece of bus handshake information.

In an alternative embodiment, in step 204 above, the test vector being configured to instruct each monitoring node to execute the test message and acquire test information of the respective subsystem to be tested includes: instructing each monitoring node to acquire a difference between a number of successful handshakes of the write address channel and a number of successful handshakes of the write response channel, and a difference between a number of successful handshakes of the read address channel and a number of successful handshakes of the read data channel of the bus of the respective subsystem to be tested; and the monitoring node being further configured to report a silence timeout interrupt in response to the differences being non-zero and the differences remaining unchanged for a period of time greater than a preset threshold.

In an alternative embodiment, in step 204 above, the test vector being configured to instruct each monitoring node to execute the test message and acquire test information of the respective subsystem to be tested includes: instructing each monitoring node to acquire address information, within a preset range, of the write address channel and the read address channel of the bus of the respective subsystem to be tested, where the address information within the preset range refers to address information of OUTSTANDING transactions counted from a current time.

In an alternative embodiment, in step 204 above, the test vector being configured to instruct each monitoring node to execute the test message and acquire test information of the respective subsystem to be tested further includes: the test vector being configured to instruct each monitoring node to acquire the test information of the respective subsystem to be tested and send the test information to the control module.

In an alternative embodiment, in step 204 above, the test vector being configured to instruct each monitoring node to execute the test message and acquire test information of the respective subsystem to be tested further includes: the test vector being configured to instruct each monitoring node to acquire the test information of the respective subsystem to be tested, package the test information according to a preset frame format, and send the packaged test information to the control module.

In an alternative embodiment, the packaged test information carries second identification information configured to identify the control module.

The above second identification information may be an ID number of the control module, as the control module can be identified based on the fact that each control module has a unique ID number.

Figure 6:
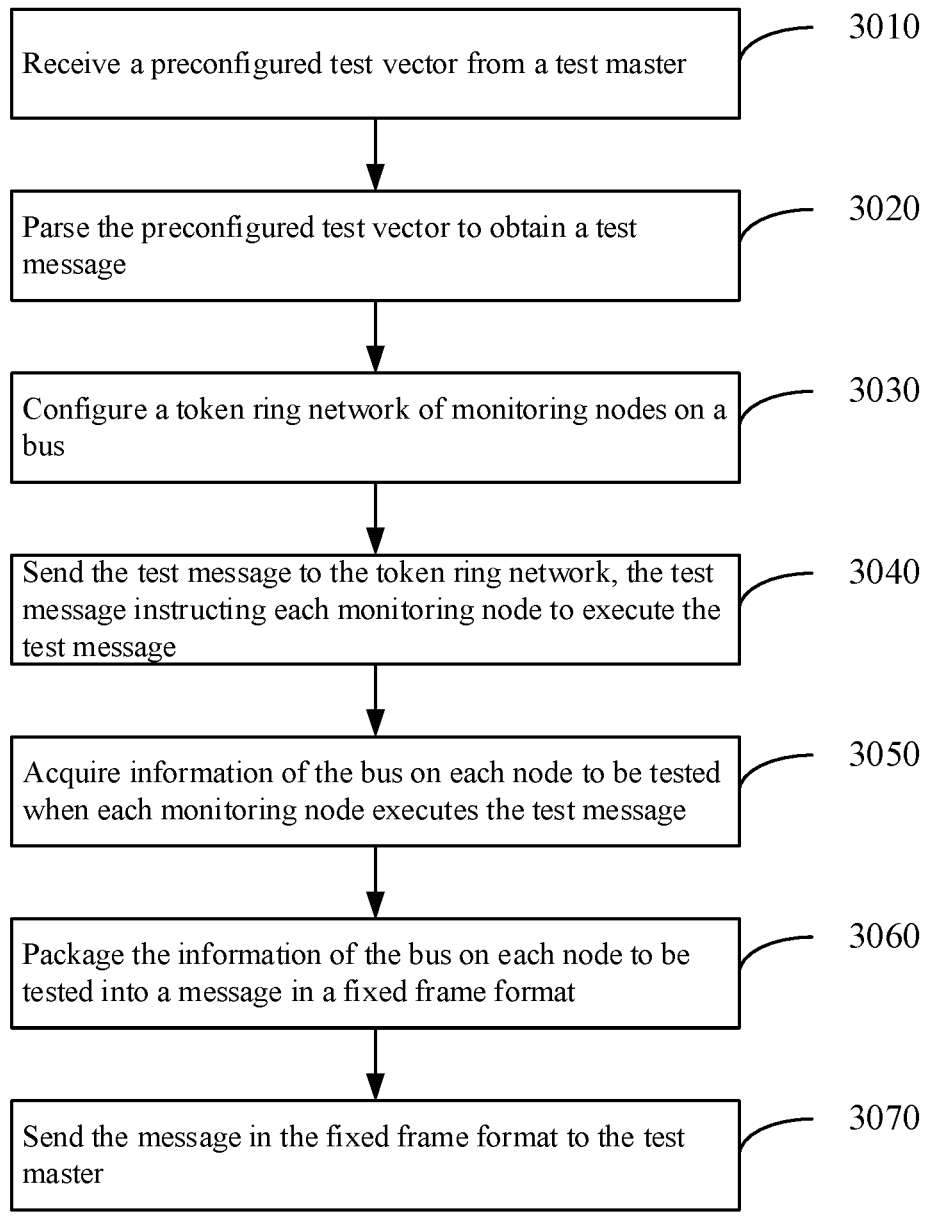
FIG. 6 is a flowchart (II) of a bus monitoring method according to an embodiment of the present disclosure.

In order to further illustrate the bus monitoring method of this embodiment, a process of bus monitoring using the bus monitoring method of this embodiment is described below. FIG. 6 is a flowchart (II) of a bus monitoring method according to an embodiment of the present disclosure. As shown in FIG. 6, the method includes the following steps.

At step 3010, a preconfigured test vector sent from a test master is received.

The preconfigured test vector sent from the test master is received, where the preconfigured test vector contains a test task for testing the bus, that is, the test condition and state of a bus can be obtained in real time through the test task, so as to learn about the state of the bus; and the test vector may be preconfigured based on actual test tasks.

At step 3020, the preconfigured test vector is parsed to obtain a test message.

The received preconfigured test vector is parsed to complete a configuration process of the test vector and finally obtain the test message. The test message is a data message in a specified frame format, which includes: header information, instruction ID information, operation command information, instruction address information, message length information, and instruction data information.

At step 3030, a token ring network of monitoring nodes is configured on a bus.

The token ring network of monitoring nodes is configured on the bus, where the token ring network of monitoring nodes includes at least two monitoring nodes, with all the monitoring nodes connected in series in a ring topology to form the token ring network, and each monitoring node arranged in a respective node to be tested on the bus.

The nodes to be tested on the bus in the test task are selected, and a corresponding monitoring node is arranged for each node to be tested, that is, the number of the monitoring nodes is equal to the number of the nodes to be tested, and each monitoring node is responsible for its own test task.

At step 3040, the test message is sent to the token ring network, and the test message instructs each monitoring node to execute the test message.

The device sends the test message to each monitoring node in the token ring network. The test message instructs each monitoring node to execute a part of the test message corresponding to equipment address information of the node to be tested.

For example, the control module in the device writes or reads 32-bit data, all the nodes to be tested on the entire bus each have an independent and unique equipment number, and the control module has a unique ID number.

In the case of execution of a write operation, the control module sends a 32-bit write operation data according to the specified format to the serial bus of the token ring network, the data including an ID number, a write control signal, an address of the node to be tested, a register address of the node to be tested, and the data to be written.

Each monitoring node, after receiving the data, detects whether the address of the respective node to be tested matches the address of the node to be tested in the data. If the two do not match each other, the test message will be transmitted to the next monitoring node in series for the next monitoring node to process. If the two match each other, the original data will be transmitted, while remaining unchanged, to the next monitoring node in serial after the corresponding write operation is executed. If none of the addresses of the nodes to be tested can be matched, the original data will also be returned, while remaining unchanged, to the test control module.

After receiving the feedback data, the control module will detect the ID number. If the ID number in the feedback data matches the ID number of the control module, the feedback data will be stored. If the two do not match each other, the feedback data will be passed on in serial while remaining unchanged.

At step 3050, information of the bus on each node to be tested is acquired when each monitoring node executes the test message.

The device acquires the information of the bus on each node to be tested when each monitoring node executes the test message. For example, the control module of the device needs to be able to: detect data written by each monitoring node into the device, and determine whether to read or write data by itself according to a read or write control signal and a feedback signal; determine correctness of the operation and extract the data correctly according to the address of the node to be tested and the register address of the node to be tested; and determine whether the operation is correctly done according to a returned feedback signal value.

Read operation: Normally, two read operations need to be performed to complete a read operation. For the first read operation, an equipment number, register address, read control signal, etc. of the respective node to be monitored are input to the monitoring node, a feedback signal value of 2'b10 is returned, and the 16-bit data read back at this time is invalid. The same 32-bit value is input for the second time and a feedback signal value is 2'b11, then the read operation is completed and a 16-bit value read back at this time is the required data value. If the feedback in the data read back for the first time is 2'b01, which indicates that the storage space is full, the device needs to perform the following operations: determining whether the data has been read without finishing the corresponding second operation. If the answer is yes, the read operation is completed. If the answer is no, which indicates another device is reading the register data of this node to be monitored, the device needs to wait and repeatedly send the read data until a feedback signal of 2'b10 is returned, which means that the read operation is in progress and the data can be read back next time.

Write operation: Different from the read operation, only one write operation needs to be performed to complete a write operation. The corresponding input according to the specified 32-bit data format is written through an asynchronous receiver-transmitter module of the device, then an equipment number, register address and write control signal of the respective node to be monitored are input to the monitoring node through the serial bus internally, and a feedback signal value of 2'b11 is returned. Neither of the feedback signal values of 2'b10 and 2'b01 will occur in a write operation.

For write and read operations, if a feedback signal value of 2'b00 is returned, it means that the input equipment number of the monitoring node does not match any of the equipment numbers of the nodes to be monitored in the bus, and the input equipment number of the monitoring node needs to be checked.

In addition, to acquire the information of the bus on each node to be tested, the time-division multiplexing technology can be used. In one embodiment, time-division multiplexing is performed with a first monitoring implementation unit in each monitoring node to acquire information of a write address channel, a write data channel and a write response channel of the bus of each node to be tested and, also, time-division multiplexing is performed with a second monitoring implementation unit in each monitoring node to acquire information of a read address channel and a read data channel of the bus on each node to be tested. Compared with using one monitoring implementation unit for each channel, this embodiment saves the logical processing resources and storage resources of three monitoring implementation units. By using the time-division multiplexing technology, hardware resources can be saved, as high level multiplexing is performed with the hardware resources, and high level multiplexing may be performed with logic processing resources and storage resources.

According to different test tasks, contents to be acquired for the information of the bus on each node to be tested are also different, which is explained as below.

In a first case, in response to a preset trigger condition being met, bus information of the write address channel, write data channel, write response channel, read address channel, and read data channel of the bus on each node to be tested when the trigger condition is met is to be acquired, where the acquisition trigger condition includes: multiplexing over the read and write channels, and a supported arrangement of combination sequence of the three channels of address, data and response. The supported arrangement of combination sequence of the three channels of address, data and response includes: for address channel triggering, an arrangement of prior triggering of the data channel is supported; for data channel triggering, an arrangement of prior triggering of the address channel is supported; and for response channel triggering, an arrangement of prior triggering of the address channel and data channel is supported.

In a second case, a last piece of handshake information of the write address channel, write data channel, write response channel, read address channel, and read data channel of the bus on each node to be tested is to be acquired.

In a third case, handshake timeout interrupt alarm information of the write address channel and write response channel of the bus on each node to be tested is to be acquired; handshake timeout interrupt alarm information of the read address channel and read data channel of the bus on each node to be tested is to be acquired; and information of a difference between a number of successful handshakes of the write address channel and a number of successful handshakes of the write response channel of the bus on each node to be tested is to be acquired, and information of a difference between a number of successful handshakes of the read address channel and a number of successful handshakes of the read data channel of the bus on each node to be tested is to be acquired.

In a fourth case, address information of the latest OUTSTANDING transactions of the write address channel and read address channel of the bus on each node to be tested is to be acquired.

The monitoring modes in the four cases above are explained below with scenario-based embodiments.

At step 3060, the information of the bus on each node to be tested is packaged into a message in a fixed frame format.

The device packages the information of the bus on each node to be tested into the message in the fixed frame format.

At step 3070, the message in the fixed frame format is sent to the test master.

The device sends the message in the fixed frame format to the test master for analysis and storage, thereby monitoring in real time whether the transmission over the bus is normal.

The monitoring process of each subsystem to be tested by the monitoring node in the above bus monitoring method of this embodiment is explained below by using embodiments based on a plurality of monitoring scenarios.

Scenario-Based Embodiment I

Figure 7:
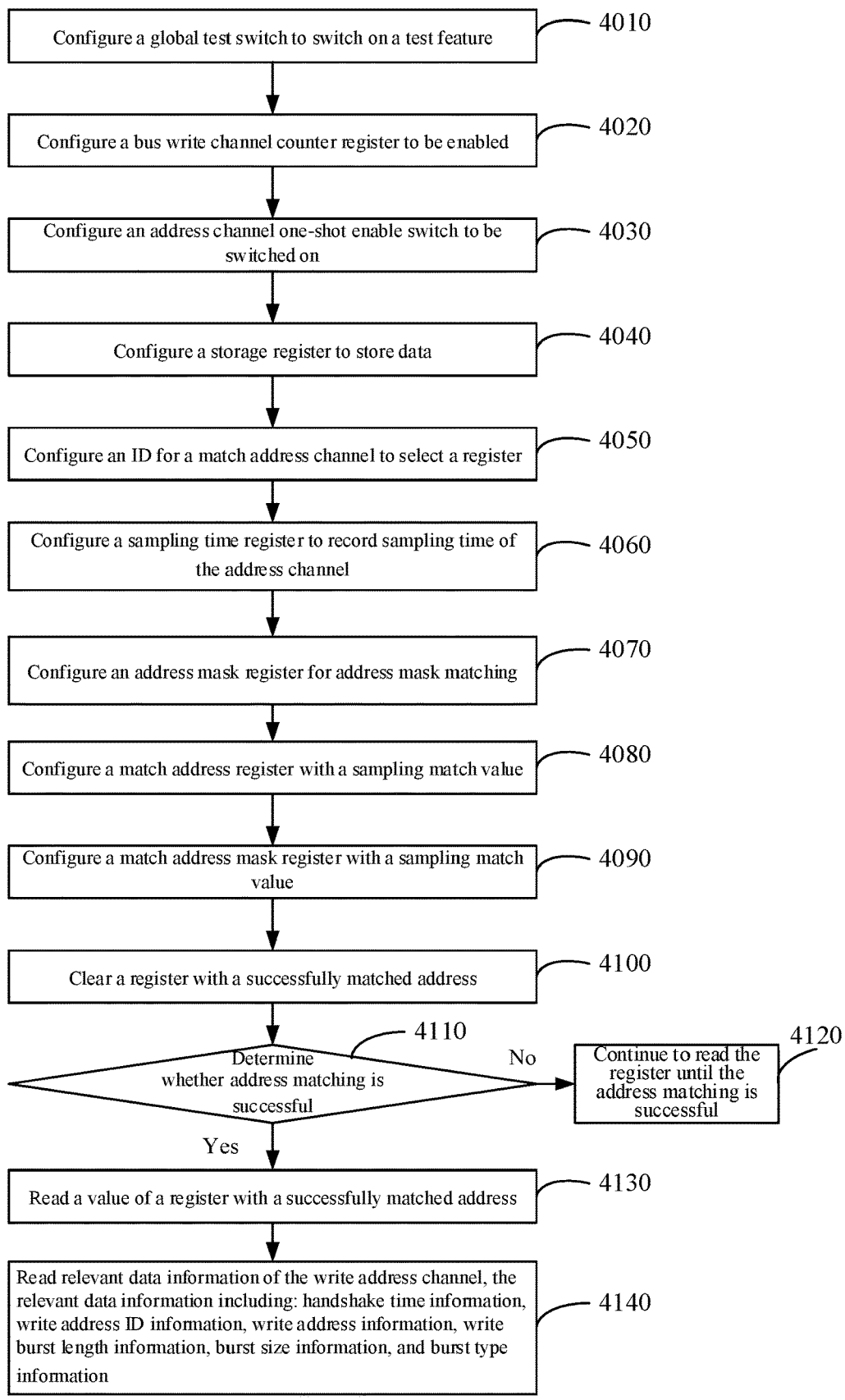
FIG. 7 is a flowchart of a scenario-based embodiment I according to an embodiment of the present disclosure.

FIG. 7 is a flowchart of a scenario-based embodiment I according to an embodiment of the present disclosure. As shown in FIG. 7, a method according to this scenario-based embodiment explains how to monitor the bus by using an example in which data of a write address channel of a bus is to be acquired with the address set as a matching item and a single trigger is performed. The steps are as follows.

At step 4010: a global test switch is configured to switch on a test feature.

At step 4020, a bus write channel counter register is configured to be enabled.

At step 4030, an address channel single trigger enable switch is configured to be switched on.

At step 4040, a storage register is configured to store data.

At step 4050, an ID is configured for a match address channel to select a register.

At step 4060, a sampling time register is configured to record sampling time of the address channel.

At step 4070, an address mask register is configured for address mask matching.

At step 4080, a match address register is configured with a sampling match value.

At step 4090, a match address mask register is configured with a sampling match value.

At step 4100, a register with a successfully matched address is cleared.

At step 4110, the method determines whether address matching is successful. If the address matching is not successful, the method proceeds to step 4120. If the address matching is successful, the method proceeds to step 4130.

At step 4120, the method continues to read the register until the address matching is successful.

At step 4130, a value of a register with a successfully matched address is read.

At step 4140, relevant data information of the write address channel is read, the relevant data information including: handshake time information, write address ID information, write address information, write burst length information, burst size information, and burst type information.

Scenario-Based Embodiment II

Figure 8:
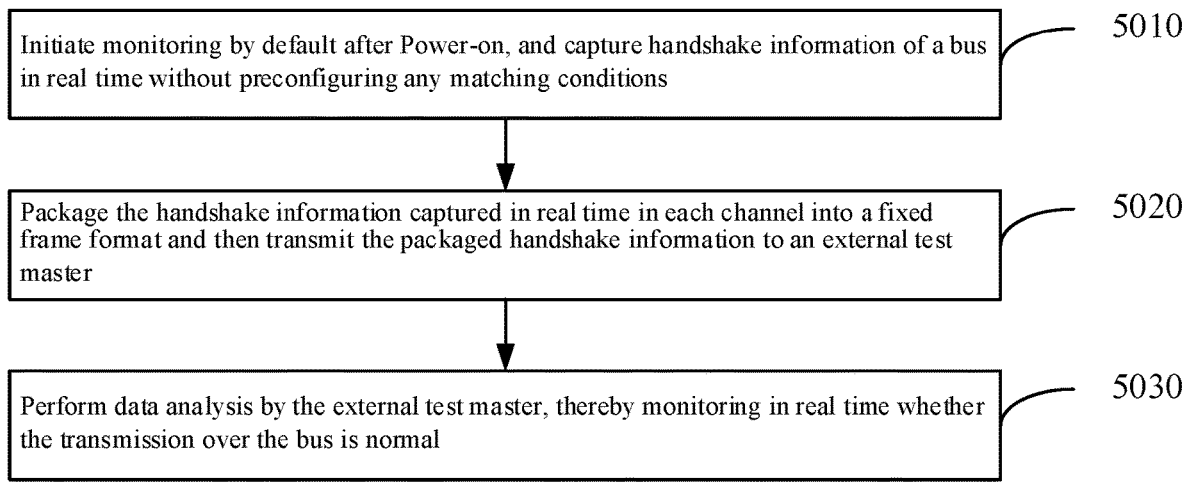
FIG. 8 is a flowchart of a scenario-based embodiment II according to an embodiment of the present disclosure.

FIG. 8 is a flowchart of a scenario-based embodiment II according to an embodiment of the present disclosure. As shown in FIG. 8, the method of this scenario-based embodiment explains how to monitor the bus by taking the monitoring of five channels of a bus as an example. The steps are as follows.

At step 5010, monitoring is initiated by default after Power-on, and handshake information of a bus is captured in real time without preconfiguring any matching conditions.

Handshake information of the write address channel includes: handshake time information, write address ID information, write address information, write burst length information, burst size information, and burst type information.

Handshake information of the write data channel includes: write data ID information, write data switch value information, and write data value information.

Handshake information of the write response channel includes: write response ID value information and write response value information.

Handshake information of the read address channel includes: handshake time information, read address ID value information, read address information, read burst length information, burst size information, and burst type information.

Handshake information of the read data channel includes: read data ID value information, read data value information and read response value information.

At step 5020, the handshake information captured in real time in each channel is packaged into a fixed frame format and then transmitted to an external test master.

At step 5030, the external test master performs data analysis, thereby monitoring in real time whether the transmission over the bus is normal.

Scenario-Based Embodiment III

Figure 9:
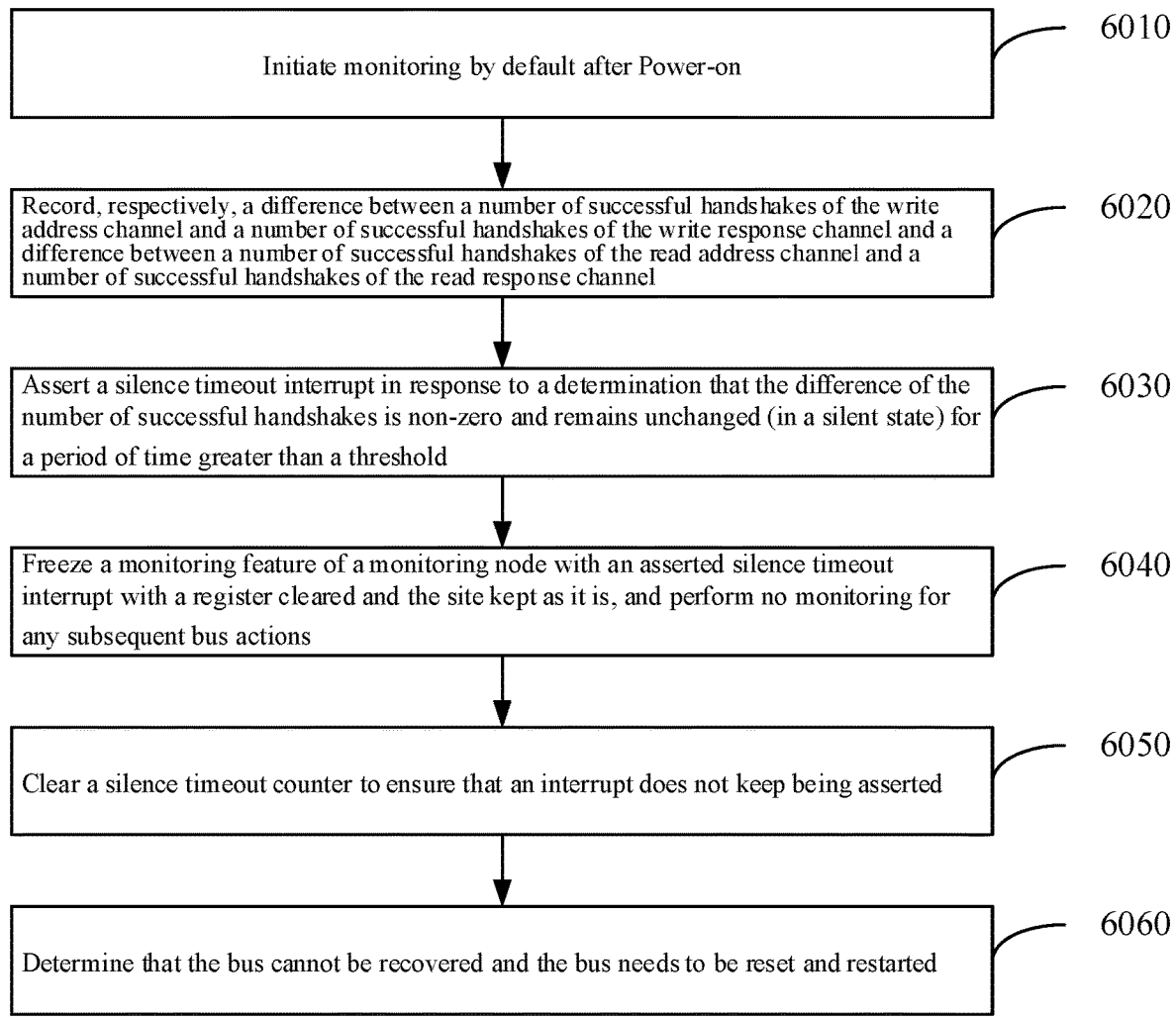
FIG. 9 is a flowchart of a scenario-based embodiment III according to an embodiment of the present disclosure.

FIG. 9 is a flowchart of a scenario-based embodiment III according to an embodiment of the present disclosure. As shown in FIG. 9, the method of this scenario-based embodiment explains how to monitor the bus by taking the monitoring of address channels of a bus as an example. The steps are as follows.

At step 6010, monitoring is initiated by default after Power-on.

At step 6020, a difference between a number of successful handshakes of the write address channel and a number of successful handshakes of the write response channel, and a difference between a number of successful handshakes of the read address channel and a number of successful handshakes of the read data channel are recorded respectively.

At step 6030, a silence timeout interrupt is asserted in response to a determination that the difference of the number of successful handshakes is non-zero and remains unchanged (in a silent state) for a period of time greater than a threshold.

At step 6040, a monitoring feature of a monitoring node with an asserted silence timeout interrupt is frozen with a register cleared and the site kept as it is, and no monitoring is performed for any subsequent bus actions.

At step 6050, a silence timeout counter is cleared to ensure that an interrupt does not keep being asserted.

At step 6060, it is determined that the bus cannot be recovered and the bus needs to be reset and restarted.

Scenario-Based Embodiment IV

Figure 10:
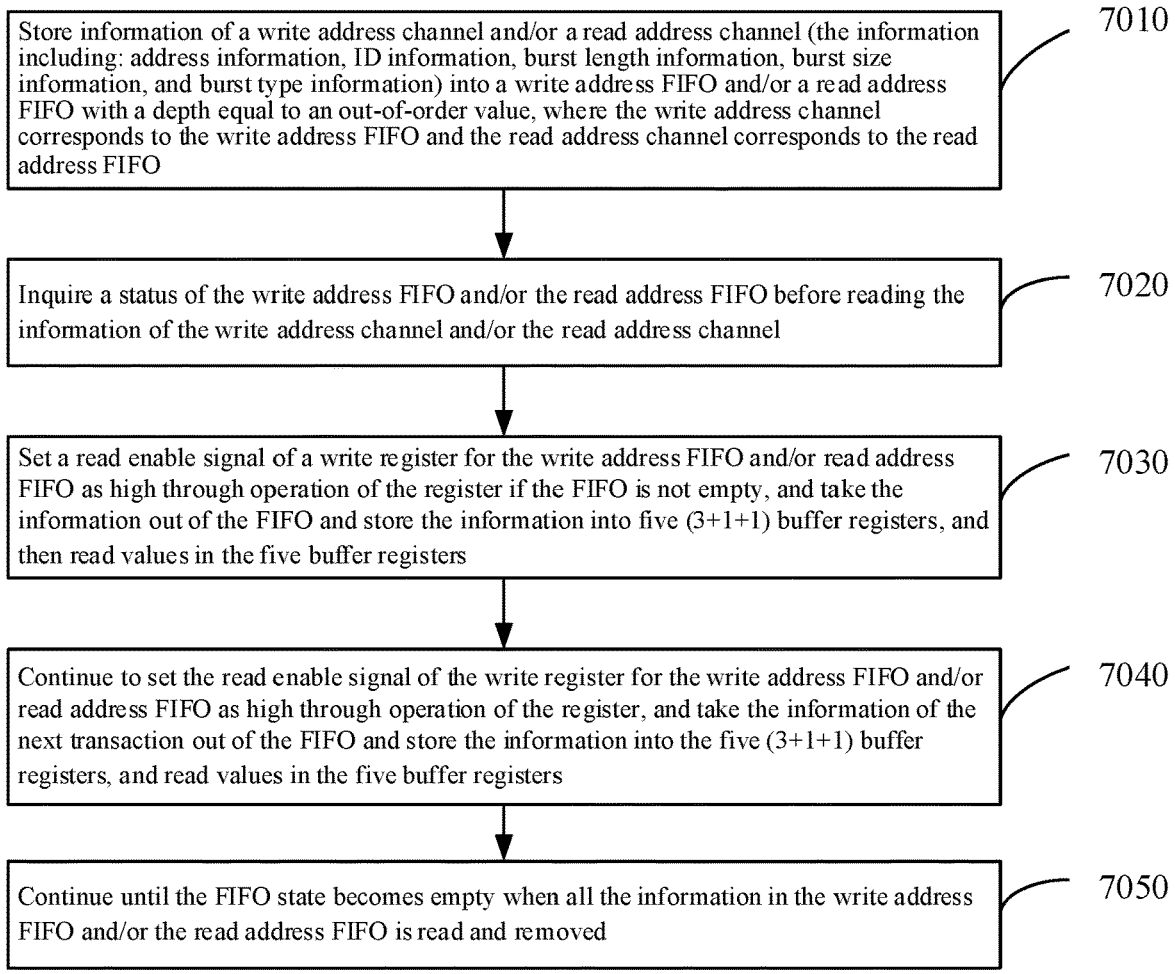
FIG. 10 is a flowchart of a scenario-based embodiment IV according to an embodiment of the present disclosure.

FIG. 10 is a flowchart of a scenario-based embodiment IV according to an embodiment of the present disclosure. As shown in FIG. 10, the method of this scenario-based embodiment explains how to monitor the bus by taking the monitoring of a write address channel and/or a read address channel of a bus as an example. The steps are as follows.

At step 7010, information of a write address channel and/or a read address channel (the information including: address information, ID information, burst length information, burst size information, and burst type information) is stored into a write address first input first output (FIFO) and/or a read address FIFO with a depth equal to an OUTSTANDING value, where the write address channel corresponds to the write address FIFO and the read address channel corresponds to the read address FIFO.

At step 7020, a status of the write address FIFO and/or the read address FIFO is inquired before reading the information of the write address channel and/or the read address channel.

At step 7030, if the FIFO is not empty, a read enable signal of a write register for the write address FIFO and/or read address FIFO is set high through operation of the register, and the information is taken out of the FIFO and stored in five (3+1+1) buffer registers, and then values in the five buffer registers are read.

At step 7040, the method continues to set the read enable signal of the write register for the write address FIFO and/or read address FIFO as high through operation of the register, and the information of the next transaction is taken out of the FIFO and stored in the five (3+1+1) buffer registers, and values in the five buffer registers are read.

At step 7050, the method continues until the FIFO state becomes empty when all the information in the write address FIFO and/or the read address FIFO is read and removed.

The above five (3+1+1) refers to the five pieces of information, i.e. the address information, ID information, burst length information, burst size information, and burst type information.

Through the description of the above embodiments, those having ordinary skills in the art can understand that the method according to the above embodiments may be realized by means of software in addition to general-purpose hardware platforms, and of course may also be realized by hardware. Based on this understanding, the technical schemes of the present disclosure may be embodied in the form of software products, which are stored in a non-transitory computer-readable storage medium (such as read-only memory (ROM)/random access memory (RAM), magnetic disk, and optical disk) and include instructions to cause a terminal device (such as a mobile phone, a computer, a server, or a network device) to perform the methods of embodiments of the present disclosure.

Example Embodiment Three

Figure 11:
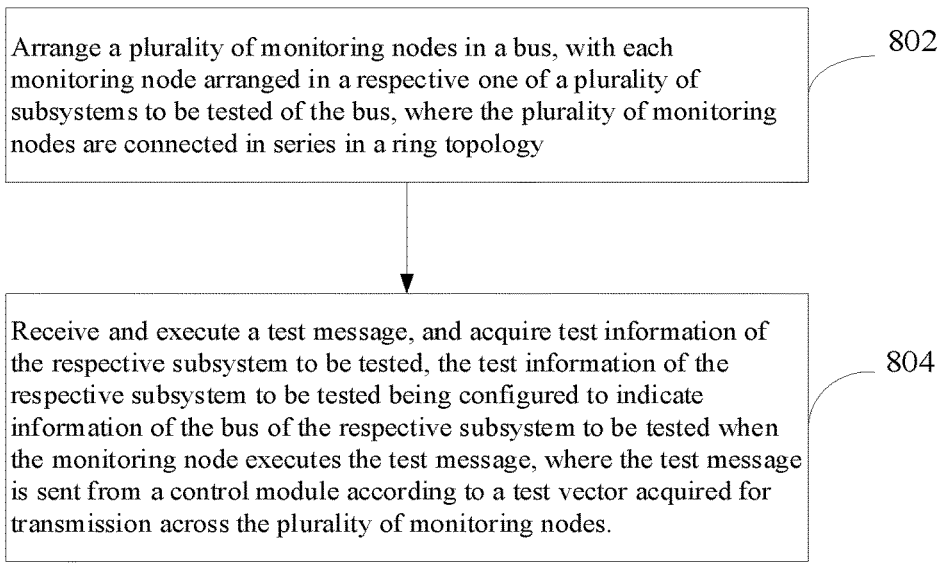
FIG. 11 is a flowchart (III) of a bus monitoring method according to an embodiment of the present disclosure.

This embodiment further provides a bus monitoring method applicable to a monitoring node. FIG. 11 is a flowchart (III) of a bus monitoring method according to an embodiment of the present disclosure. As shown in FIG. 11, the bus monitoring method includes:

step 802: arranging a plurality of monitoring nodes in a bus, with each monitoring node arranged in a respective one of a plurality of subsystems to be tested of the bus, where the plurality of monitoring nodes are connected in series in a ring topology;

step 804: receiving and executing a test message and acquiring test information of the respective subsystem to be tested, the test information of the respective subsystem to be tested being configured to indicate information of the bus of the respective subsystem to be tested when the monitoring node executes the test message, where the test message is sent from a control module according to a test vector acquired for transmission across the plurality of monitoring nodes.

According to the bus monitoring method in this embodiment, since the plurality of monitoring nodes in the bus can be each arranged in a respective subsystem to be tested in the bus, where the plurality of monitoring nodes are connected in series in a ring topology, when the control module acquires a test vector and sends a test message according to the test vector for transmission across the plurality of monitoring nodes, each monitoring node may execute the test message and acquire test information of the respective subsystem to be tested, where the test information of the respective subsystem to be tested is configured to indicate information of the bus of the respective subsystem to be tested when the monitoring node executes the test message. Therefore, the bus monitoring method in this embodiment can solve the technical problem in existing technologies that SoCs cannot monitor nodes in real time during operation, so as to achieve the effect of real-time node monitoring during operation of SoCs.

Other technical schemes of the bus monitoring method in this embodiment correspond to those of the bus monitoring method in Embodiment 2 and, therefore, will not be repeated here.

In an alternative embodiment, in step 804, the test message being sent from a control module according to a test vector acquired for transmission across the plurality of monitoring nodes includes: the control module acquiring the test vector, parsing the test vector to obtain the test message, and sending the test message for transmission across the plurality of monitoring nodes.

In an alternative embodiment, in step 804, the test message being sent from a control module according to a test vector acquired for transmission across the plurality of monitoring nodes further includes: the control module acquiring the test vector and parsing the test vector to obtain the test message; generating a configuration message according to the test message and sending the configuration message to the plurality of subsystems to be tested of the bus, where the configuration message is configured to instruct the plurality of subsystems to be tested to perform configuration processing according to the configuration message; and after the plurality of subsystems to be tested finish the configuration processing, sending the test message for transmission across the plurality of monitoring nodes.

In an alternative embodiment, the test message includes a plurality of test sub-messages, each of which carries first identification information configured to identify one of the subsystems to be tested; and each test sub-message is configured to instruct a monitoring node to execute the test sub-message according to the first identification information, where the monitoring node is the monitoring node arranged in the subsystem to be tested which is identified by the first identification information.

In an alternative embodiment, in step 804, receiving and executing the test message and acquiring test information of the respective subsystem to be tested includes: performing time-division multiplexing with a first monitoring implementation unit to acquire information of a write address channel, a write data channel and a write response channel of the bus of the respective subsystem to be tested, and performing time-division multiplexing with a second monitoring implementation unit to acquire information of a read address channel and a read data channel of the bus of the respective subsystem to be tested, where the first monitoring implementation unit and the second monitoring implementation unit are both arranged in the monitoring node.

In an alternative embodiment, in step 804, receiving and executing the test message and acquiring test information of the respective subsystem to be tested includes: acquiring a trigger sequence of the address channels, the data channels and the response channel of the bus of the respective subsystem to be tested, where the address channels include the write address channel and the read address channel, the data channels include the write data channel and the read data channel, and the response channel includes the write response channel. The trigger sequence of the address channels, the data channels and the response channel includes the following situations: for address channel triggering, prior triggering of the data channel is supported; or, for data channel triggering, prior triggering of the address channel is supported; or, for response channel triggering, prior triggering of the address channel and data channel are supported.

In an alternative embodiment, in step 804, receiving and executing the test message and acquiring test information of the respective subsystem to be tested includes: acquiring bus handshake information, within a preset range, of the write address channel, the write data channel, the write response channel, the read address channel, and the read data channel of the bus of the respective subsystem to be tested.

In an alternative embodiment, in step 804, receiving and executing the test message and acquiring test information of the respective subsystem to be tested includes:

acquiring a difference between a number of successful handshakes of the write address channel and a number of successful handshakes of the write response channel, and a difference between a number of successful handshakes of the read address channel and a number of successful handshakes of the read data channel of the bus of the respective subsystem to be tested; and the monitoring node being further configured to report a silence timeout interrupt in response to the differences being non-zero and the differences remaining unchanged for a period of time greater than a preset threshold.

In an alternative embodiment, in step 804, receiving and executing the test message and acquiring test information of the respective subsystem to be tested includes: acquiring address information, within a preset range, of the write address channel and the read address channel of the bus of the respective subsystem to be tested, where the preset range refers to OUTSTANDING transactions counted from a current time.

In an alternative embodiment, in step 804, receiving and executing the test message and acquiring test information of the respective subsystem to be tested further includes: acquiring the test information of the respective subsystem to be tested and sending the test information to the control module.

In an alternative embodiment, in step 804, receiving and executing the test message and acquiring test information of the respective subsystem to be tested further includes: acquiring the test information of the respective subsystem to be tested, packaging the test information according to a preset frame format, and sending the packaged test information to the control module.

In an alternative embodiment, the packaged test information carries second identification information configured to identify the control module.

Through the description of the above embodiments, those having ordinary skills in the art can understand that the method according to the above embodiments may be realized by means of software in addition to general-purpose hardware platforms, and of course may also be realized by hardware. Based on this understanding, the technical schemes of the present disclosure may be embodied in the form of software products, which are stored in a non-transitory computer-readable storage medium (such as ROM/RAM, magnetic disk, and optical disk) and include instructions to cause a terminal device (such as a mobile phone, a computer, a server, or a network device) to perform the methods of embodiments of the present disclosure.

Example Embodiment Four

This embodiment further provides a bus monitoring device applicable to a control module. The device is used to implement the above embodiments and implementations, which have been described above and will not be repeated here. As used below, the term "module" may be a combination of software and/or hardware that implements a predefined function. Although the device described in the following embodiments may be implemented in software, implementations by hardware or a combination of software and hardware are also possible and contemplated.

Figure 12:
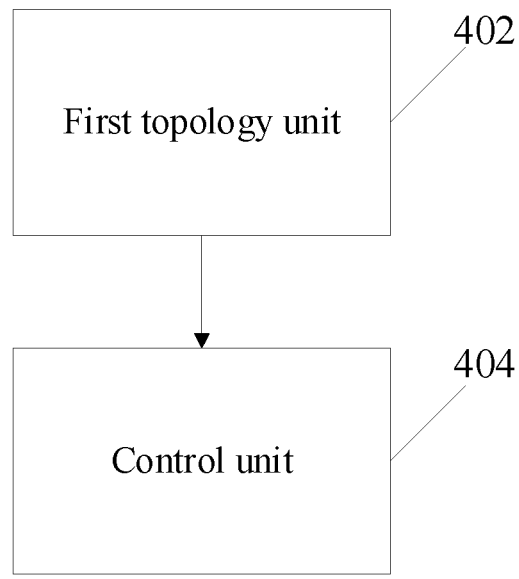
FIG. 12 is a schematic block diagram (I) of a bus monitoring device according to an embodiment of the present disclosure.

FIG. 12 is a block diagram (I) of a bus monitoring device according to an embodiment of the present disclosure. As shown in FIG. 12, the device includes: a first topology unit 402 configured to arrange a plurality of monitoring nodes in a bus, with each monitoring node arranged in a subsystem to be tested of the bus, where the plurality of monitoring nodes are connected in series in a ring topology; and a control unit 404 configured to acquire a test vector and send a test message according to the test vector for transmission across the plurality of monitoring nodes, the test vector being configured to instruct each monitoring node to execute the test message and acquire test information of the respective subsystem to be tested, where the test information of the respective subsystem to be tested is configured to indicate information of the bus of the respective subsystem to be tested when the monitoring node executes the test message.

According to the bus monitoring device in this embodiment, since the plurality of monitoring nodes in the bus can be each arranged in a respective subsystem to be tested in the bus, where the plurality of monitoring nodes are connected in series in a ring topology, when the control module acquires a test vector and sends a test message according to the test vector for transmission across the plurality of monitoring nodes, each monitoring node may execute the test message and acquire test information of the respective subsystem to be tested, where the test information of the respective subsystem to be tested is configured to indicate information of the bus of the respective subsystem to be tested when the monitoring node executes the test message. Therefore, the bus monitoring device in this embodiment can solve the technical problem in existing technologies that SoCs cannot monitor nodes in real time during operation, so as to achieve the effect of real-time node monitoring during operation of SoCs.

Other technical schemes of the bus monitoring device in this embodiment correspond to the bus monitoring method in Embodiment 2 and, therefore, will not be repeated here.

In an alternative embodiment, acquiring a test vector and sending a test message according to the test vector for transmission across the plurality of monitoring nodes includes: acquiring the test vector, parsing the test vector to obtain the test message, and sending the test message for transmission across the plurality of monitoring nodes.

In an alternative embodiment, acquiring a test vector and sending a test message according to the test vector for transmission across the plurality of monitoring nodes further includes: acquiring the test vector and parsing the test vector to obtain the test message; generating a configuration message according to the test message and sending the configuration message to the plurality of subsystems to be tested of the bus, where the configuration message is configured to instruct the plurality of subsystems to be tested to perform configuration processing according to the configuration message; and after the plurality of subsystems to be tested finish the configuration processing, sending the test message for transmission across the plurality of monitoring nodes.

In an alternative embodiment, the test message includes a plurality of test sub-messages, each of which carries first identification information configured to identify one of the subsystems to be tested. Each test sub-message is configured to instruct a monitoring node to execute the test sub-message according to the first identification information, where the monitoring node is the monitoring node arranged in the subsystem to be tested which is identified by the first identification information.

In an alternative embodiment, the test vector being configured to instruct each monitoring node to execute the test message and acquire test information of the respective subsystem to be tested includes: performing time-division multiplexing with a first monitoring implementation unit to acquire information of a write address channel, a write data channel and a write response channel of the bus of the respective subsystem to be tested, and performing time-division multiplexing with a second monitoring implementation unit to acquire information of a read address channel and a read data channel of the bus of the respective subsystem to be tested, where the first monitoring implementation unit and the second monitoring implementation unit are both arranged in the monitoring node.

In an alternative embodiment, the test vector being configured to instruct each monitoring node to execute the test message and acquire test information of the respective subsystem to be tested includes: instructing each monitoring node to acquire a trigger sequence of the address channels, the data channels and the response channel of the bus of the respective subsystem to be tested, where the address channels include the write address channel and the read address channel, the data channels include the write data channel and the read data channel, and the response channel includes the write response channel. The trigger sequence of the address channels, the data channels and the response channel includes the following situations: for address channel triggering, prior triggering of the data channel is supported; or, for data channel triggering, prior triggering of the address channel is supported; or, for response channel triggering, prior triggering of the address channel and data channel are supported.

In an alternative embodiment, the test vector being configured to instruct each monitoring node to execute the test message and acquire test information of the respective subsystem to be tested includes: instructing the monitoring node to acquire bus handshake information, within a preset range, of the write address channel, the write data channel, the write response channel, the read address channel, and the read data channel of the bus of the respective subsystem to be tested.

In an alternative embodiment, the test vector being configured to instruct each monitoring node to execute the test message and acquire test information of the respective subsystem to be tested includes: instructing each monitoring node to acquire a difference between a number of successful handshakes of the write address channel and a number of successful handshakes of the write response channel, and a difference between a number of successful handshakes of the read address channel and a number of successful handshakes of the read data channel of the bus of the respective subsystem to be tested; and the monitoring node being further configured to report a silence timeout interrupt in response to the differences being non-zero and the differences remaining unchanged for a period of time greater than a preset threshold.

In an alternative embodiment, the test vector being configured to instruct each monitoring node to execute the test message and acquire test information of the respective subsystem to be tested includes: instructing each monitoring node to acquire address information, within a preset range, of the write address channel and the read address channel of the bus of the respective subsystem to be tested, where the address information within the preset range refers to address information of OUTSTANDING transactions counted from a current time.

In an alternative embodiment, the test vector being configured to instruct each monitoring node to execute the test message and acquire test information of the respective subsystem to be tested further includes: the test vector being configured to instruct each monitoring node to acquire the test information of the respective subsystem to be tested and send the test information to the control module.

In an alternative embodiment, the test vector being configured to instruct each monitoring node to execute the test message and acquire test information of the respective subsystem to be tested further includes: the test vector being configured to instruct each monitoring node to acquire the test information of the respective subsystem to be tested, package the test information according to a preset frame format, and send the packaged test information to the control module.

In an alternative embodiment, the packaged test information carries second identification information configured to identify the control module.

The plurality of modules described above can be realized by software or hardware, and the latter can be implemented by but not limited to: the above modules being all located in one and the same processor; or the above modules being located separately in different processors in any combination thereof.

Example Embodiment Five

This embodiment further provides a bus monitoring device applicable to a monitoring node. The device is used to implement the above embodiments and alternative embodiments, which have been described above and will not be repeated here. As used below, the term "module" may be a combination of software and/or hardware that implements a predefined function. Although the device described in the following embodiments may be implemented in software, implementations by hardware or a combination of software and hardware are also possible and contemplated.

Figure 13:
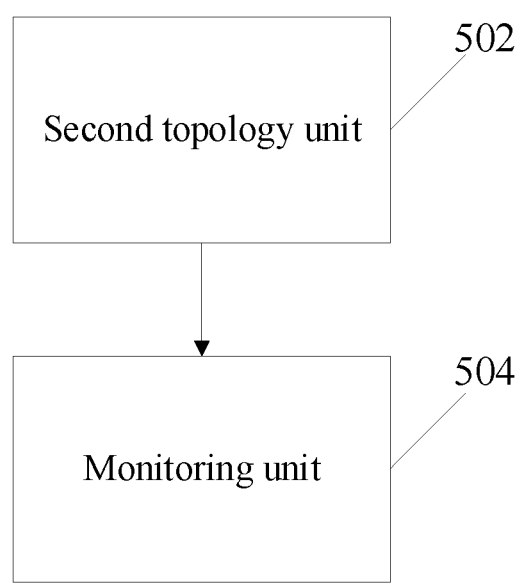
FIG. 13 is a schematic block diagram (II) of a bus monitoring method according to an embodiment of the present disclosure.

FIG. 13 is a block diagram (II) of a bus monitoring device according to an embodiment of the present disclosure. As shown in FIG. 13, the device includes: a second topology unit configured to arrange a plurality of monitoring nodes in a bus, with each monitoring node arranged in a subsystem to be tested of the bus, where the plurality of monitoring nodes are connected in series in a ring topology; and a monitoring unit configured to receive and execute a test message and acquire test information of the subsystem to be tested, the test information of the subsystem to be tested being configured to indicate information of the bus of the subsystem to be tested when the monitoring node executes the test message, where the test message is sent from a control module according to a test vector acquired for transmission across the plurality of monitoring nodes.

According to the bus monitoring device in this embodiment, since the plurality of monitoring nodes in the bus can be each arranged in a respective subsystem to be tested in the bus, where the plurality of monitoring nodes are connected in series in a ring topology, when the control module acquires a test vector and sends a test message according to the test vector for transmission across the plurality of monitoring nodes, each monitoring node may execute the test message and acquire test information of the respective subsystem to be tested, where the test information of the respective subsystem to be tested is configured to indicate information of the bus of the respective subsystem to be tested when the monitoring node executes the test message. Therefore, the bus monitoring device in this embodiment can solve the technical problem in existing technologies that SoCs cannot monitor nodes in real time during operation, so as to achieve the effect of real-time node monitoring during operation of SoCs.

Other technical schemes of the bus monitoring device in this embodiment correspond to the bus monitoring method in Embodiment 2 and, therefore, will not be repeated here.

In an alternative embodiment, the test message being sent from a control module according to a test vector acquired for transmission across the plurality of monitoring nodes includes: the control module acquiring the test vector, parsing the test vector to obtain the test message, and sending the test message for transmission across the plurality of monitoring nodes.

In an alternative embodiment, the test message being sent from a control module according to a test vector acquired for transmission across the plurality of monitoring nodes further includes: the control module acquiring the test vector and parsing the test vector to obtain the test message; generating a configuration message according to the test message and sending the configuration message to the plurality of subsystems to be tested of the bus, where the configuration message is configured to instruct the plurality of subsystems to be tested to perform configuration processing according to the configuration message; and after the plurality of subsystems to be tested finish the configuration processing, sending the test message for transmission across the plurality of monitoring nodes.

In an alternative embodiment, the test message includes a plurality of test sub-messages, each of which carries first identification information configured to identify one of the subsystems to be tested; and each test sub-message is configured to instruct a monitoring node to execute the test sub-message according to the first identification information, where the monitoring node is the monitoring node arranged in the subsystem to be tested which is identified by the first identification information.

In an alternative embodiment, receiving and executing the test message and acquiring test information of the respective subsystem to be tested includes: performing time-division multiplexing with a first monitoring implementation unit to acquire information of a write address channel, a write data channel and a write response channel of the bus of the respective subsystem to be tested, and performing time-division multiplexing with a second monitoring implementation unit to acquire information of a read address channel and a read data channel of the bus of the respective subsystem to be tested, where the first monitoring implementation unit and the second monitoring implementation unit are both arranged in the monitoring node.

In an alternative embodiment, receiving and executing the test message and acquiring test information of the respective subsystem to be tested includes: acquiring a trigger sequence of the address channels, the data channels and the response channel of the bus of the respective subsystem to be tested, where the address channels include the write address channel and the read address channel, the data channels include the write data channel and the read data channel, and the response channel includes the write response channel. The trigger sequence of the address channels, the data channels and the response channel includes the following situations: for address channel triggering, prior triggering of the data channel is supported; or, for data channel triggering, prior triggering of the address channel is supported; or, for response channel triggering, prior triggering of the address channel and data channel are supported.

In an alternative embodiment, receiving and executing the test message and acquiring test information of the respective subsystem to be tested includes: acquiring bus handshake information, within a preset range, of the write address channel, the write data channel, the write response channel, the read address channel, and the read data channel of the bus of the respective subsystem to be tested.

In an alternative embodiment, receiving and executing the test message and acquiring test information of the respective subsystem to be tested includes: acquiring a difference between a number of successful handshakes of the write address channel and a number of successful handshakes of the write response channel, and a difference between a number of successful handshakes of the read address channel and a number of successful handshakes of the read data channel of the bus of the respective subsystem to be tested; and the monitoring node being further configured to report a silence timeout interrupt in response to the differences being non-zero and the differences remaining unchanged for a period of time greater than a preset threshold.

In an alternative embodiment, receiving and executing the test message and acquiring test information of the respective subsystem to be tested includes: acquiring address information, within a preset range, of the write address channel and the read address channel of the bus of the respective subsystem to be tested, where the address information within the preset range refers to address information of OUTSTANDING transactions counted from a current time.

In an alternative embodiment, receiving and executing the test message and acquiring test information of the respective subsystem to be tested further includes: acquiring the test information of the respective subsystem to be tested and sending the test information to the control module.

In an alternative embodiment, receiving and executing the test message and acquiring test information of the respective subsystem to be tested further includes: acquiring the test information of the respective subsystem to be tested, packaging the test information according to a preset frame format, and sending the packaged test information to the control module.

In an alternative embodiment, the packaged test information carries second identification information configured to identify the control module.

Example Embodiment Six

An embodiment of the present disclosure further provides a non-transitory computer-readable storage medium in which a computer program is stored, where the computer program is configured to, when executed, implement the steps of any of the above method embodiments.

Alternatively, in this embodiment, the above non-transitory computer-readable storage medium may be configured to store a computer program for executing the following steps:
step 10: arranging a plurality of monitoring nodes in a bus, with each monitoring node arranged in a respective one of a plurality of subsystems to be tested of the bus, where the plurality of monitoring nodes are connected in series in a ring topology;
step 20: acquiring a test vector and sending a test message according to the test vector for transmission across the plurality of monitoring nodes, the test vector being configured to instruct each monitoring node to execute the test message and acquire test information of the respective subsystem to be tested, where the test information of the respective subsystem to be tested is configured to indicate information of the bus of the respective subsystem to be tested when the monitoring node executes the test message.

In this embodiment, the above-mentioned non-transitory computer-readable storage medium may include, but is not limited to, various media that can store computer programs, such as a USB flash drive, an ROM, an RAM, a mobile hard disk, a magnetic disk or an optical disk.

Example Embodiment Seven

An embodiment of the present disclosure further provides a non-transitory computer-readable storage medium in which a computer program is stored, where the computer program is configured to, when executed, implement the steps of any of the above method embodiments.

Alternatively, in this embodiment, the above non-transitory computer-readable storage medium may be configured to store a computer program for executing the following steps:

step 10: arranging a plurality of monitoring nodes in a bus, with each monitoring node arranged in a respective one of a plurality of subsystems to be tested of the bus, where the plurality of monitoring nodes are connected in series in a ring topology; and step 20: receiving and executing a test message and acquiring test information of the respective subsystem to be tested, the test information of the respective subsystem to be tested being configured to indicate information of the bus of the respective subsystem to be tested when the monitoring node executes the test message, where the test message is sent from a control module according to a test vector acquired for transmission across the plurality of monitoring nodes.

Alternatively, in this embodiment, the above-mentioned non-transitory computer-readable storage medium may include, but is not limited to, various media that can store computer programs, such as a USB flash drive, an ROM, an RAM, a mobile hard disk, a magnetic disk or an optical disk.

Example Embodiment Eight

An embodiment of the present disclosure further provides an electronic device, including a memory and a processor, where a computer program is stored in the memory, and the processor is configured to execute the computer program to perform the steps in any of the above method embodiments.

Alternatively, the electronic device above may further include transmission equipment and input/output equipment, where the transmission equipment is connected to the processor and the input/output equipment is connected to the processor.

Alternatively, in this embodiment, the above processor may be configured to execute the following steps through the computer program:

step 10: arranging a plurality of monitoring nodes in a bus, with each monitoring node arranged in a respective one of a plurality of subsystems to be tested of the bus, where the plurality of monitoring nodes are connected in series in a ring topology; and step 20: acquiring a test vector and sending a test message according to the test vector for transmission across the plurality of monitoring nodes, the test vector being configured to instruct each monitoring node to execute the test message and acquire test information of the respective subsystem to be tested, where the test information of the respective subsystem to be tested is configured to indicate information of the bus of the respective subsystem to be tested when the monitoring node executes the test message.

Alternatively, for specific examples of this embodiment, the examples described in the above embodiments and alternative embodiments can be referred to, which will not be repeated here in this embodiment.

Example Embodiment Nine

An embodiment of the present disclosure further provides an electronic device, including a memory and a processor, where a computer program is stored in the memory, and the processor is configured to execute the computer program to perform the steps in any of the above method embodiments.

Alternatively, the electronic device above may further include transmission equipment and input/output equipment, where the transmission equipment is connected to the processor and the input/output equipment is connected to the processor.

Alternatively, in this embodiment, the above processor may be configured to execute the following steps through the computer program:

step 10: arranging a plurality of monitoring nodes in a bus, with each monitoring node arranged in a respective one of a plurality of subsystems to be tested of the bus, where the plurality of monitoring nodes are connected in series in a ring topology; and step 20: receiving and executing a test message and acquiring test information of the respective subsystem to be tested, the test information of the respective subsystem to be tested being configured to indicate information of the bus of the respective subsystem to be tested when the monitoring node executes the test message, where the test message is sent from a control module according to a test vector acquired for transmission across the plurality of monitoring nodes.

Alternatively, for specific examples of this embodiment, the examples described in the above embodiments and implementations can be referred to, which will not be repeated here in this embodiment.

Obviously, those having ordinary skills in the art should understand that the above modules or steps of the present disclosure may be implemented by a general-purpose computing device and may be concentrated in one single computing device or distributed in a network composed of a plurality of computing devices. Alternatively, the above modules or steps may be implemented by program codes executable by a computing device, so that the above modules or steps can be stored in a storage device and executed by the computing device. Moreover, in some cases, the steps shown or described herein can be performed in a different order, or the above modules or steps can be made into a plurality of integrated circuit modules, respectively, or some of the above modules or steps can be made into one single integrated circuit module. As such, the present disclosure is not limited to any specified combination of hardware and software.

The invention claimed is:

1. A bus monitoring method applicable to a control module, wherein, the control module is in connection with a plurality of monitoring nodes arranged in a bus, with each monitoring node arranged in a respective one of a plurality of subsystems to be tested of the bus; and each monitoring node comprises: a monitoring connection unit configured to realize a connection between the respective monitoring node and the respective subsystem to be tested, and a monitoring implementation unit configured to monitor whether an address of the respective subsystem to be tested matches the address of the respective subsystem to be tested in data; and the plurality of monitoring nodes are connected in series in a ring topology:

the method comprises,
acquiring a test vector and sending a test message according to the test vector to one of the plurality of monitoring nodes so as to transmit the test message in series across the plurality of monitoring nodes, and
the test vector is configured to instruct each monitoring node to execute the test message and acquire test information of the respective subsystem to be tested, wherein the test information of the respective subsystem to be tested is configured to indicate information of the bus of the respective subsystem to be tested when the monitoring node executes the test message.

2. The method of claim 1, wherein acquiring a test vector and sending a test message according to the test vector to one of the plurality of monitoring nodes so as to transmit the test message across the plurality of monitoring nodes comprises:
acquiring the test vector, parsing the test vector to obtain the test message, and sending the test message to one of the plurality of monitoring nodes so as to transmit the test message across the plurality of monitoring nodes.

3. The method of claim 1, wherein acquiring a test vector and sending a test message according to the test vector to one of the plurality of monitoring nodes so as to transmit the test message across the plurality of monitoring nodes comprises:
acquiring the test vector and parsing the test vector to obtain the test message;
generating a configuration message according to the test message and sending the configuration message to the plurality of subsystems to be tested of the bus, wherein the configuration message is configured to instruct the plurality of subsystems to be tested to perform configuration processing according to the configuration message; and
after the plurality of subsystems to be tested complete the configuration processing, sending the test message to one of the plurality of monitoring nodes so as to transmit the test message across the plurality of monitoring nodes.

4. The method of claim 1, wherein
the test message comprises a plurality of test sub-messages, each of which carries first identification information configured to identify one of the subsystems to be tested; and
each test sub-message is configured to instruct a target monitoring node to execute the test sub-message according to the first identification information carried by the test sub-message, wherein the target monitoring node is the monitoring node arranged in the subsystem to be tested which is identified by the first identification information carried by the test sub-message.

5. The method of claim 1, wherein the test vector being configured to instruct each monitoring node to acquire test information of the respective subsystem to be tested comprises:
the test vector being configured to instruct each monitoring node to perform time-division multiplexing with a first monitoring implementation unit to acquire information of a write address channel, a write data channel and a write response channel of the bus of the respective subsystem to be tested, and to perform time-division multiplexing with a second monitoring implementation unit to acquire information of a read address channel and a read data channel of the bus of the respective subsystem to be tested,
wherein the first monitoring implementation unit and the second monitoring implementation unit are both arranged in the monitoring node.

6. The method of claim 5, wherein the test vector being configured to instruct each monitoring node to acquire test information of the respective subsystem to be tested comprises:
the test vector being configured to instruct each monitoring node to acquire the test information of the respective subsystem to be tested in response to the address channels, the data channels and the response channel of the bus of the respective subsystem to be tested meeting a preset trigger sequence condition, the address channels including the write address channel and the read address channel, the data channels including the write data channel and the read data channel, and the response channel including the write response channel,
wherein the address channels, the data channels and the response channel of the bus of the respective subsystem to be tested meeting a preset trigger sequence condition comprises at least one of the following:
on condition that the address channels are matching objects of the monitoring node, the trigger sequence condition is that the data channels are triggered prior to the address channels;
on condition that the data channels are matching objects of the monitoring node, the trigger sequence condition is that the address channels are triggered prior to the data channels; or
on condition that the response channel is a matching object of the monitoring node, the trigger sequence condition is that both the address channels and the data channels are triggered prior to the response channel.

7. The method of claim 5, wherein the test vector being configured to instruct each monitoring node to acquire test information of the respective subsystem to be tested comprises:
the test vector being configured to instruct each monitoring node to acquire bus handshake information, within a preset range, of the write address channel, the write data channel, the write response channel, the read address channel, and the read data channel of the bus of the respective subsystem to be tested.

8. The method of claim 5, wherein the test vector being configured to instruct each monitoring node to acquire test information of the respective subsystem to be tested comprises:
the test vector being configured to instruct each monitoring node to acquire a difference between a number of successful handshakes of the write address channel and a number of successful handshakes of the write response channel, and a difference between a number of successful handshakes of the read address channel and a number of successful handshakes of the read data channel, of the bus of the respective subsystem to be tested; and
the monitoring node being further configured to report a silence timeout interrupt in response to at least one of the difference between the number of successful handshakes of the write address channel and the number of successful handshakes of the write response channel, or the difference between the number of successful handshakes of the read address channel and the number of successful handshakes of the read data channel being non-zero and the differences remaining unchanged for a period of time greater than a preset threshold.

9. The method of claim 5, wherein the test vector being configured to instruct each monitoring node to execute the test message and acquire test information of the respective subsystem to be tested comprises:
the test vector being configured to instruct each monitoring node to acquire address information, within a preset range, of the write address channel and the read address channel of the bus of the respective subsystem to be tested, wherein the address information within the preset range refers to address information of OUTSTANDING transactions counted from a current time.

10. The method of claim 1, wherein the test vector being configured to instruct each monitoring node to acquire test information of the respective subsystem to be tested comprises:

the test vector being configured to instruct each monitoring node to acquire the test information of the respective subsystem to be tested and send the test information to the control module.

11. The method of claim 1, wherein the test vector being configured to instruct each monitoring node to acquire test information of the respective subsystem to be tested comprises:

the test vector being configured to instruct each monitoring node to acquire the test information of the respective subsystem to be tested, package the test information according to a preset frame format, and send the packaged test information to the control module.

12. The method of claim 11, wherein the packaged test information carries second identification information configured to identify the control module.

13. A bus monitoring method applicable to a monitoring node, wherein, the monitoring node is one of a plurality of monitoring nodes in connection with a control module; and the monitoring node are arranged in a bus, with each monitoring node arranged in a respective one of a plurality of subsystems to be tested of the bus; and each monitoring node comprises: a monitoring connection unit configured to realize a connection between the respective monitoring node and the respective subsystem to be tested, and a monitoring implementation unit configured to monitor whether an address of the respective subsystem to be tested matches the address of the respective subsystem to be tested in data; and the plurality of monitoring nodes are connected in series in a ring topology;

the method comprises,
receiving and executing a test message and acquiring test information of the respective subsystem to be tested, the test information of the respective subsystem to be tested is configured to indicate information of the bus of the respective subsystem to be tested when the monitoring node executes the test message,
wherein the test message is sent from a control module to one of the plurality of monitoring nodes according to a test vector acquired so as to transmit the test message in series across the plurality of monitoring nodes.

14. The method of claim 13, wherein the test message being sent from a control module to one of the plurality of monitoring nodes according to a test vector acquired so as to transmit the test message across the plurality of monitoring nodes comprises:

the control module acquiring the test vector, parsing the test vector to obtain the test message, and sending the test message to one of the plurality of monitoring nodes so as to transmit the test message across the plurality of monitoring nodes.

15. The method of claim 13 wherein the test message being sent from a control module to one of the plurality of monitoring nodes according to a test vector acquired so as to transmit the test message across the plurality of monitoring nodes comprises:

the control module acquiring the test vector and parsing the test vector to obtain the test message;
the control module generating a configuration message according to the test message and sending the configuration message to the plurality of subsystems to be tested of the bus, wherein the configuration message is configured to instruct the plurality of subsystems to be tested to perform configuration processing according to the configuration message; and
after the plurality of subsystems to be tested complete the configuration processing, the control module sending the test message to one of the plurality of monitoring nodes so as to transmit the test message across the plurality of monitoring nodes.

16. The method of claim 13, wherein
the test message comprises a plurality of test sub-messages, each of which carries first identification information configured to identify one of the subsystems to be tested; and
each test sub-message is configured to instruct a target monitoring node to execute the test sub-message according to the first identification information carried by the test sub-message, wherein the target monitoring node is the monitoring node arranged in the subsystem to be tested which is identified by the first identification information carried by the test sub-message.

17. The method of claim 13, wherein acquiring the test information of the respective subsystem to be tested comprises:

performing time-division multiplexing with a first monitoring implementation unit to acquire information of a write address channel, a write data channel and a write response channel of the bus of the respective subsystem to be tested, and
performing time-division multiplexing with a second monitoring implementation unit to acquire information of a read address channel and a read data channel of the bus of the respective subsystem to be tested,
wherein the first monitoring implementation unit and the second monitoring implementation unit are both arranged in the monitoring node.

18. The method of claim 17, wherein acquiring the test information of the respective subsystem to be tested comprises:

acquiring the test information of the respective subsystem to be tested in response to the address channels, the data channels and the response channel of the bus of the respective subsystem to be tested meeting a preset trigger sequence condition, the address channels including the write address channel and the read address channel, the data channels including the write data channel and the read data channel, and the response channel including the write response channel,
wherein the address channels, the data channels and the response channel of the bus of the respective subsystem to be tested meeting a preset trigger sequence condition comprises at least one of the following:
on condition that the address channels are matching objects of the monitoring node, the trigger sequence condition is that the data channels are triggered prior to the address channels;
on condition that the data channels are matching objects of the monitoring node, the trigger sequence condition is that the address channels are triggered prior to the data channels; or
on condition that the response channel is a matching object of the monitoring node, the trigger sequence condition is that both the address channels and the data channels are triggered prior to the response channel.

19. The method of claim 17, wherein acquiring the test information of the respective subsystem to be tested comprises:
acquiring bus handshake information, within a preset range, of the write address channel, the write data channel, the write response channel, the read address channel, and the read data channel of the bus of the respective subsystem to be tested.

20. The method of claim 17, wherein acquiring the test information of the respective subsystem to be tested comprises:
acquiring a difference between a number of successful handshakes of the write address channel and a number of successful handshakes of the write response channel, and a difference between a number of successful handshakes of the read address channel and a number of successful handshakes of the read data channel of the bus of the respective subsystem to be tested; and
the monitoring node reporting a silence timeout interrupt in response to at least one of, the difference between the number of successful handshakes of the write address channel and the number of successful handshakes of the write response channel, or the difference between the number of successful handshakes of the read address channel and the number of successful handshakes of the read data channel of the bus of the respective subsystem to be tested being non-zero and the differences remaining unchanged for a period of time greater than a preset threshold.

21. The method of claim 17, wherein acquiring the test information of the respective subsystem to be tested comprises:
acquiring address information, within a preset range, of the write address channel and the read address channel of the bus of the respective subsystem to be tested, wherein the address information within the preset range refers to address information of OUTSTANDING transactions counted from a current time.

22. A non-transitory computer-readable storage medium storing a computer program which, when executed, implement the method of claim 14.

23. An electronic device, comprising a memory and a processor, wherein a computer program is stored in the memory, and the processor is configured to execute the computer program to perform a bus monitoring method applicable to a control module, wherein, the control module is in connection with a plurality of monitoring nodes arranged in a bus, with each monitoring node arranged in a respective one of a plurality of subsystems to be tested of the bus; and each monitoring node comprises: a monitoring connection unit configured to realize a connection between the respective monitoring node and the respective subsystem to be tested, and a monitoring implementation unit configured to monitor whether an address of the respective subsystem to be tested matches the address of the respective subsystem to be tested in data; and the plurality of monitoring nodes are connected in series in a ring topology;
the method comprises,
acquiring a test vector and sending a test message according to the test vector to one of the plurality of monitoring nodes so as to transmit the test message in series across the plurality of monitoring nodes, and
the test vector is configured to instruct each monitoring node to execute the test message and acquire test information of the respective subsystem to be tested, wherein the test information of the respective subsystem to be tested is configured to indicate information of the bus of the respective subsystem to be tested when the monitoring node executes the test message.

24. A non-transitory computer-readable storage medium storing a computer program which, when executed, implement the method of claim 13.

25. An electronic device, comprising a memory and a processor, wherein a computer program is stored in the memory, and the processor is configured to execute the computer program to perform a bus monitoring method applicable to a monitoring node, wherein, the monitoring node is one of a plurality of monitoring nodes in connection with a control module; and the monitoring node are arranged in a bus, with each monitoring node arranged in a respective one of a plurality of subsystems to be tested of the bus; and each monitoring node comprises: a monitoring connection unit configured to realize a connection between the respective monitoring node and the respective subsystem to be tested, and a monitoring implementation unit configured to monitor whether an address of the respective subsystem to be tested matches the address of the respective subsystem to be tested in data; and the plurality of monitoring nodes are connected in series in a ring topology;
the method comprises,
receiving and executing a test message and acquiring test information of the respective subsystem to be tested, the test information of the respective subsystem to be tested is configured to indicate information of the bus of the respective subsystem to be tested when the monitoring node executes the test message,
wherein the test message is sent from a control module to one of the plurality of monitoring nodes according to a test vector acquired so as to transmit the test message in series across the plurality of monitoring nodes.

* * * * *